United States Patent
Panganiban et al.

(10) Patent No.: US 8,346,465 B2
(45) Date of Patent: Jan. 1, 2013

(54) METHOD AND APPARATUS FOR DETERMINING AND DISPLAYING MEANINGFUL CROSS STREET FOR NAVIGATION SYSTEM

(75) Inventors: Alex Panganiban, Torrance, CA (US); Tatsuo Yokota, Torrance, CA (US); Jay Jayakumar, Torrance, CA (US)

(73) Assignee: Apline Electronics, Inc, Tokyo (JP)

( * ) Notice: Subject to any disclaimer, the term of this patent is extended or adjusted under 35 U.S.C. 154(b) by 1301 days.

(21) Appl. No.: 12/072,409

(22) Filed: Feb. 26, 2008

(65) Prior Publication Data

US 2009/0216434 A1 Aug. 27, 2009

(51) Int. Cl.
G01C 21/00 (2006.01)

(52) U.S. Cl. ........ 701/208; 701/400; 701/408; 701/425; 701/431; 701/436; 701/437; 701/454; 701/468; 340/988; 340/995.1; 340/995.14; 340/995.2; 340/996

(58) Field of Classification Search .................. None
See application file for complete search history.

(56) References Cited

U.S. PATENT DOCUMENTS

| | | | |
|---|---|---|---|
| 4,937,752 A | | 6/1990 | Nanba et al. |
| 5,515,283 A | * | 5/1996 | Desai et al. ............... 701/461 |
| 5,739,772 A | * | 4/1998 | Nanba et al. ............. 340/990 |
| 5,902,350 A | * | 5/1999 | Tamai et al. ............. 701/437 |
| 5,908,465 A | * | 6/1999 | Ito et al. ............. 701/532 |
| 6,006,161 A | * | 12/1999 | Katou ............. 701/410 |
| 6,035,253 A | * | 3/2000 | Hayashi et al. ............. 701/428 |
| 6,144,318 A | * | 11/2000 | Hayashi et al. ............. 340/995.19 |
| 6,285,317 B1 | * | 9/2001 | Ong ............. 342/357.57 |
| 6,356,840 B2 | * | 3/2002 | Kusama ............. 701/437 |
| 6,360,168 B1 | * | 3/2002 | Shimabara ............. 701/436 |
| 6,388,582 B2 | * | 5/2002 | Yamashita et al. ............. 340/988 |
| 6,477,526 B2 | * | 11/2002 | Hayashi et al. ............. 701/532 |
| 6,564,224 B1 | * | 5/2003 | Wu et al. ............. 1/1 |
| 6,587,787 B1 | * | 7/2003 | Yokota ............. 701/532 |
| 6,633,814 B2 | * | 10/2003 | Kohli et al. ............. 701/466 |
| 6,643,585 B2 | | 11/2003 | McGovern |
| 6,650,326 B1 | * | 11/2003 | Huber et al. ............. 345/428 |
| 6,732,049 B2 | * | 5/2004 | Sato et al. ............. 701/416 |
| 6,771,189 B2 | * | 8/2004 | Yokota ............. 340/990 |
| 6,859,723 B2 | * | 2/2005 | Yokota ............. 701/532 |
| 6,871,143 B2 | * | 3/2005 | Fujiwara ............. 701/533 |
| 6,999,075 B2 | * | 2/2006 | Kumagai ............. 345/420 |
| 7,042,370 B2 | | 5/2006 | Morie |
| 7,127,350 B2 | * | 10/2006 | Oikubo ............. 701/437 |
| 7,383,126 B2 | * | 6/2008 | Takahashi ............. 701/437 |
| 7,395,152 B2 | * | 7/2008 | Watanabe et al. ............. 701/437 |

(Continued)

FOREIGN PATENT DOCUMENTS

JP 2004-177351 6/2004

*Primary Examiner* — Johnathan M Dager

(74) *Attorney, Agent, or Firm* — Muramatsu & Associates

(57) ABSTRACT

A method and apparatus for a navigation system determines whether an upcoming cross street is meaningful for a user to be displayed. The includes the steps of searching upcoming cross streets that intersect with a current street on which a user's vehicle is running for a predetermined distance range ahead of a current vehicle position, retrieving data concerning the upcoming cross streets from the map data, determining whether a cross street is meaningful for the user to be displayed on a screen of the navigation system by applying predetermined rules to the data concerning the cross street, and displaying information on the cross street that has been determined to be meaningful for the user on the screen.

8 Claims, 19 Drawing Sheets

U.S. PATENT DOCUMENTS

| | | | |
|---|---|---|---|
| 7,502,685 B2 * | 3/2009 | Nakamura | 701/437 |
| 7,554,462 B2 * | 6/2009 | Mori | 340/995.14 |
| 7,590,487 B2 * | 9/2009 | De Silva | 701/436 |
| 7,698,055 B2 * | 4/2010 | Horvitz et al. | 701/117 |
| 7,698,063 B2 * | 4/2010 | Kim | 701/437 |
| 7,765,055 B2 * | 7/2010 | Cera et al. | 701/117 |
| 7,783,422 B2 * | 8/2010 | Tanaka | 701/436 |
| 7,930,101 B2 * | 4/2011 | Geelen et al. | 701/436 |
| 7,945,852 B1 * | 5/2011 | Pilskalns | 715/230 |
| 8,095,308 B2 * | 1/2012 | Tsuji | 701/437 |
| 2003/0050756 A1 * | 3/2003 | McGovern | 701/211 |
| 2004/0056861 A1 * | 3/2004 | Huber et al. | 345/428 |
| 2004/0183700 A1 * | 9/2004 | Morie | 340/995.1 |
| 2005/0033511 A1 * | 2/2005 | Pechatnikov et al. | 701/210 |
| 2005/0119826 A1 * | 6/2005 | Lee et al. | 701/209 |
| 2005/0149262 A1 * | 7/2005 | Oikubo | 701/211 |
| 2005/0171694 A1 * | 8/2005 | Schirmer et al. | 701/211 |
| 2005/0234639 A1 * | 10/2005 | Endo et al. | 701/209 |
| 2005/0273256 A1 * | 12/2005 | Takahashi | 701/211 |
| 2006/0074553 A1 * | 4/2006 | Foo et al. | 701/212 |
| 2006/0195257 A1 * | 8/2006 | Nakamura | 701/211 |
| 2006/0195258 A1 * | 8/2006 | Kim et al. | 701/211 |
| 2007/0050133 A1 * | 3/2007 | Yoshikawa et al. | 701/209 |
| 2007/0124069 A1 * | 5/2007 | Nakayama et al. | 701/210 |
| 2008/0021641 A1 * | 1/2008 | Kim | 701/209 |
| 2008/0036626 A1 * | 2/2008 | Kim | 340/995.14 |
| 2008/0228386 A1 * | 9/2008 | Geelen et al. | 701/201 |
| 2009/0187335 A1 * | 7/2009 | Muhlfelder et al. | 701/200 |
| 2010/0013669 A1 * | 1/2010 | Tanaka | 340/905 |
| 2010/0045699 A1 * | 2/2010 | Dayan et al. | 345/629 |

* cited by examiner for Cross Street 61-63 for Cross Street 60 & 64

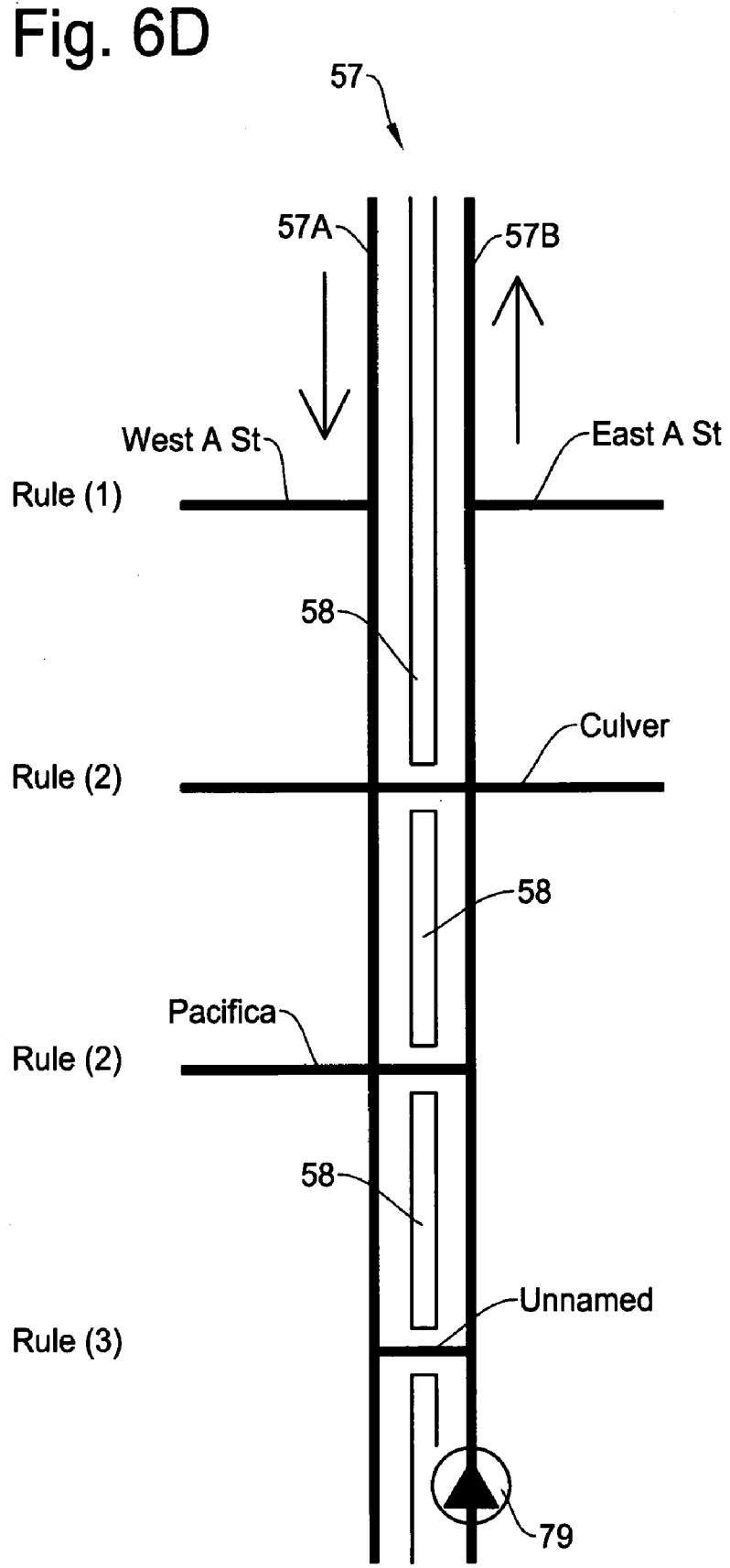

Fig. 6E   for East A Street
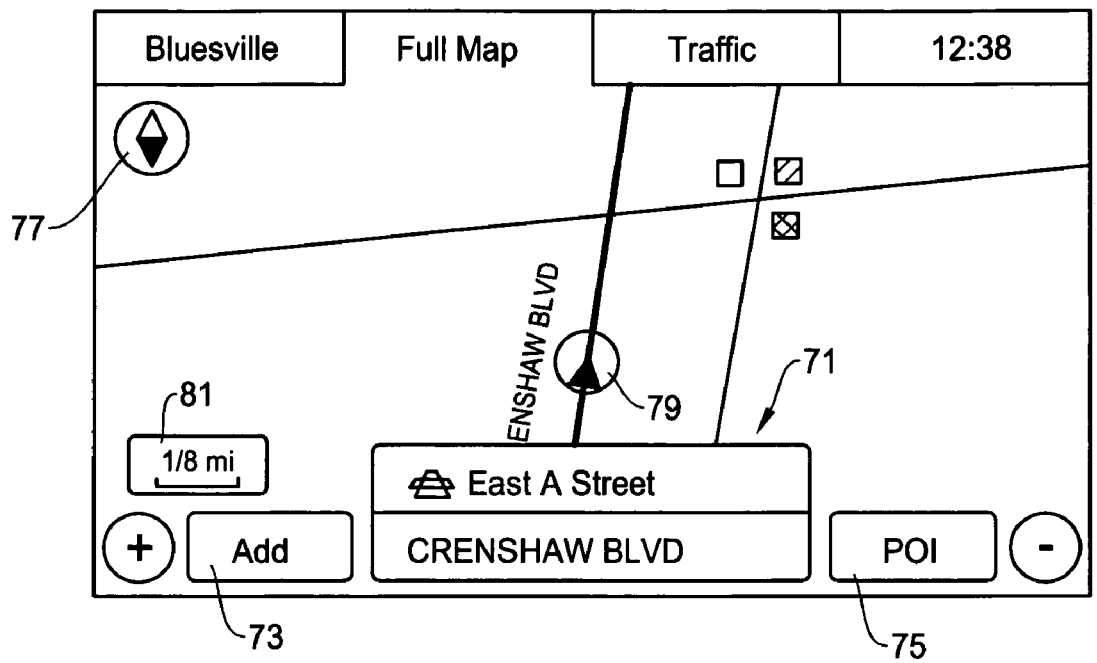
Fig. 6F   for West A Street
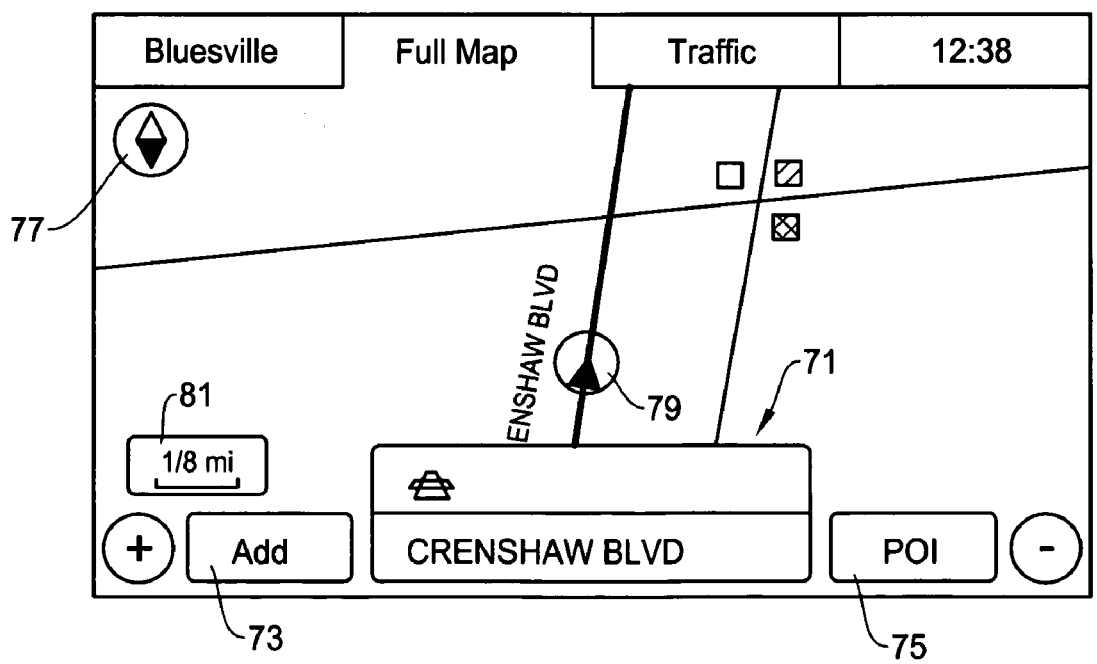

for Cross Point 91 for Cross Point 92

Fig. 7D    for Cross Point 93
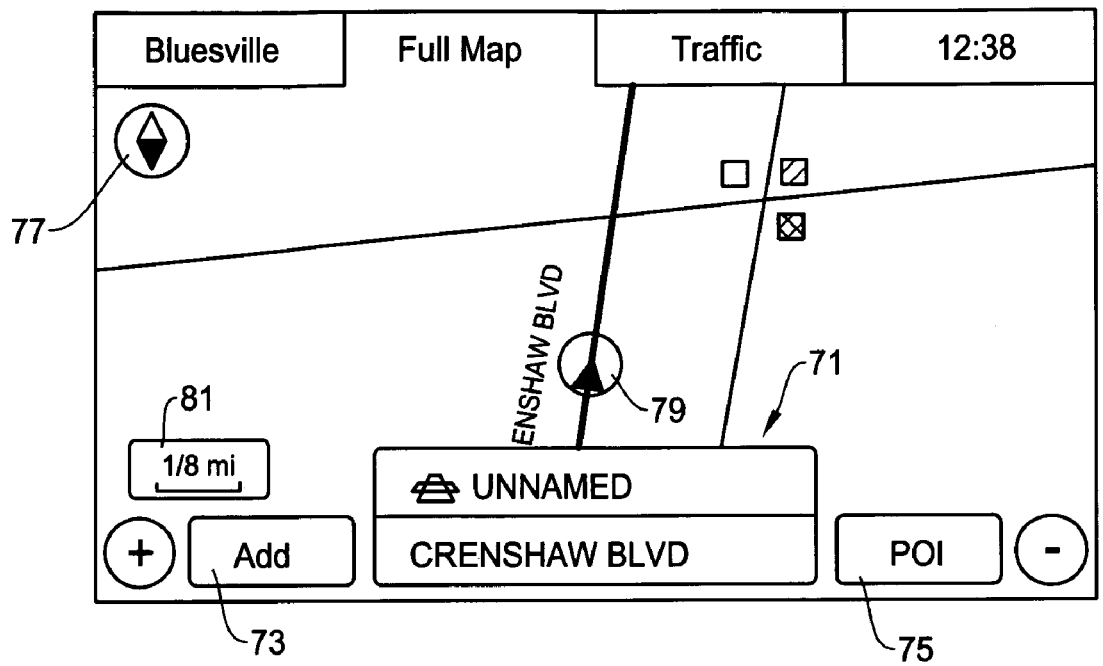
Fig. 7E    for Cross Point 94
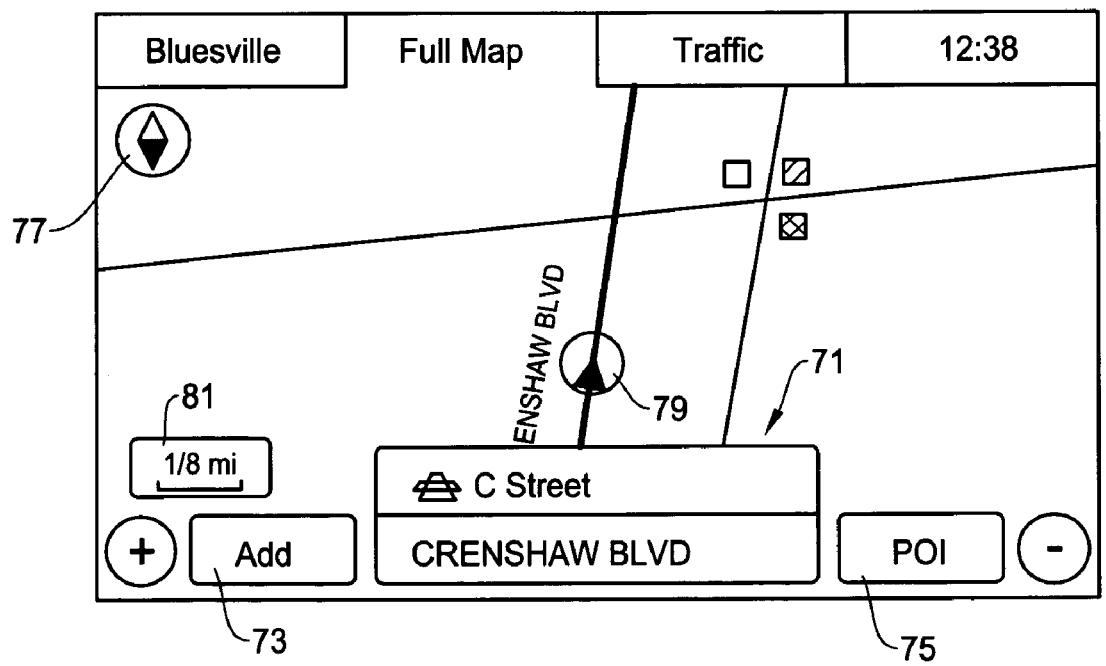

for Cross Point 96 for Cross Point 97 for Cross Point 98 for Cross Point 99

METHOD AND APPARATUS FOR DETERMINING AND DISPLAYING MEANINGFUL CROSS STREET FOR NAVIGATION SYSTEM

FIELD OF THE INVENTION

This invention relates generally to a method and apparatus for displaying a street name, and more particularly, to a method and apparatus for a navigation system for determining whether an upcoming cross street is meaningful for a user to be displayed on the screen and, if so, selecting an appropriate name of the cross street name to be displayed on the screen by evaluating various factors associated with the cross streets.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc, etc., or from a remote data server.

Typically, during a map mode, the navigation system displays a map image on a monitor screen while superimposing thereon a mark representing the current location of the user's vehicle. During a route guidance mode, the navigation system further displays a calculated route to the destination on the map image in a highlighted manner. At an intersection, if a turn is necessary, the navigation system notifies the user which direction to turn at the intersection such as by displaying an arrow image and generating audible instructions.

In displaying a map on a screen of a navigation system either on a map mode or a route guidance mode, information regarding a cross street ahead of the vehicle is useful for a user. Thus, a navigation system typically displays a name of the road on which the vehicle is currently running and a name of the next street that will intersect with the current street. However, some cross streets may not be very meaningful since the map data generally used in navigation system include road links that are not actually usable for vehicles of ordinary users or because of a particular location and direction of the vehicle, etc.

For instance, there is a cross street such as an emergency cross street on a freeway that is available to law enforcement vehicles but not generally available to the general public. In another instance, there is a cross road that merely connects two opposite sides of the road having a central divider. In a further instance, such a cross street or a road segment is meaningless if it not accessible for the user because it is a one-way street due to the particular location and direction of the vehicle.

Even when the next cross street is meaningless to a user as in the above example, the conventional navigation system shows the relevant information regarding the cross street. For example, FIG. 1A is a schematic diagram showing an example of display screen in which the navigation system displays the next cross street that is illustrated "UNKNOWN" because a particular cross street that comes next is not named and is not usable by a user. Such a display of known or unknown name of meaningless cross street is useless for a user and may be distracting to the safe driving.

Moreover, even when there is a meaningful next cross street, there may be a plurality of possible candidate names at an intersection when the name of each road that connected to the next cross street is different from one another. Such a situation is shown in the schematic diagram of FIG. 1B which shows that the vehicle position 78 is moving on a street "Harvard Avenue" toward an intersection 76. In this example, the name of the street running in a left/right direction changes from "Edinger Avenue" (left side) to "Irvine Center Drive" (right side), or vice versa, at the intersection 76.

In the example of FIG. 1B, the navigation system will have to determine which name is likely to be more meaningful to the user. There may be even more complex situations where more than two streets of different names connect to an intersection. Thus, there is a need of new method and apparatus to determine whether a next cross street is meaningful enough to display, and if so, which name is the most meaningful and helpful to the driver. Further, there is a need of new method and apparatus to determine whether a cross street associated with a unique street type such as a double-digitized road is meaningful to the user.

SUMMARY OF THE INVENTION

It is, therefore, an object of the present invention to provide a display method and apparatus for a navigation system which is capable of determining whether a next street that intersects with the current road is meaningful enough to display based on various criteria.

It is another object of the present invention to provide a display method and apparatus for a navigation system which is capable of determining which name associated with the cross street is more meaningful for the user to display based on various factors.

It is a further object of the present invention to provide a display method and apparatus for a navigation system which is capable of determining whether a next street is meaningful enough to display based on various criteria when the current street is a unique type such as a double-digitized road.

It is a further object of the present invention to provide various rules to be used by a display method and apparatus for a navigation system for determining whether a next street is meaningful enough to display when the current street is a double-digitized road.

It is a further object of the present invention to provide various rules to be used by a display method and apparatus for a navigation system for determining which name associated with the cross street is more meaningful for the user to be displayed.

One aspect of the present invention is a display method for a navigation system to determine whether an upcoming cross street is meaningful for the user to be displayed and, if so, to display the cross street on the screen of the navigation system. The method includes the steps of: searching upcoming cross streets that intersect with a current street on which a user's vehicle is running for a predetermined distance range ahead of a current vehicle position, retrieving data concerning the upcoming cross streets from the map data, determining whether a cross street is meaningful for the user to be displayed on a screen of the navigation system by applying predetermined rules to the data concerning the cross street, and displaying information on the cross street that has been determined to be meaningful for the user on the screen.

The display method further includes a step of checking a type of street of the current street, and if the current street is a double-digitized road, a step of applying predetermined rules associated with the double-digitized road to determine whether a particular cross street is meaningful to the user.

In the display method, the predetermined rules associated with the double-digitized road include a rule in that if the particular cross street is not accessible to the user because of the current vehicle position and driving direction, the particular cross street is not meaningful to the user. Further in the display method, the predetermined rules associated with the double-digitized road include a rule in that if the particular cross street merely connects two one-way street lines of opposite directions that form the double-digitized road, the particular cross street is not meaningful to the user.

The display method, when it is determined that a particular cross street is meaningful for the user to be displayed on the screen, further includes a step of applying predetermined rules for determining an appropriate name of the cross street to be displayed on the screen in a case where two or more streets are associated with the cross street.

In the display method, the predetermined rules for determining an appropriate name of the cross street include a rule in that if one street is unnamed while other street is named, the name of the other street is displayed. Further, the predetermined rules for determining an appropriate name of the cross street further include a rule in that if one street is higher in functional class than that of other, a name of the street with higher functional class is displayed.

In the display method, the predetermined rules for determining an appropriate name of the cross street further include a rule in that if one street name is more commonly used than other street name, the street name of more commonly used is displayed. Further, the predetermined rules for determining an appropriate name of the cross street further include a rule in that if one street is accessible while other street is not accessible because of the current vehicle position and driving direction, the name of the street that is accessible is displayed.

In the display method, the predetermined rules for determining an appropriate name of the cross street further include a rule in that if one street is closer to the current vehicle position than other street, the name of the street that is closer to the vehicle is displayed, and a further rule in that if one street is on a side same as that the vehicle is running on the current street while other street is on a side opposite to that the vehicle is running on the current street, the name of the street that is on the same side is displayed.

Another aspect of the present invention is a display apparatus for a navigation system to display the upcoming cross street that is meaningful to the user by implementing the various steps of the display method described above. The display apparatus of the present invention enables to provide meaningful cross street information while refraining from providing the information concerning a meaningless cross street, thereby avoiding to distract the user from the safe driving.

According to the present invention, the navigation system checks the upcoming cross streets that intersect with the current street on which the user's vehicle is running and determines whether a particular cross street is meaningful for the user to be displayed. Such determination is made by evaluating a particular structure of the cross street, a particular type of the current street on which the user's vehicle is running, a current vehicle position and driving direction, etc. In the case where the cross street is meaningful to be displayed on the screen, the navigation system further determines which name associated with the cross street is more appropriate to be displayed. Such determination is made by evaluating various factors associated with the cross street, such as whether a street is named or unnamed, whether one street name is more commonly used than the other, whether one street is higher in the functional class than the other, whether a particular street is accessible by the user's vehicle, whether a particular street is closer to the user's vehicle, etc. Thus, the navigation system of the present invention provides the user with the information regarding the meaningful cross street while refraining from providing the information concerning a meaningless cross street, thereby avoiding to distract the user from the safe driving.

BRIEF DESCRIPTION OF THE DRAWINGS

FIG. 1A shows a display example in which a name of the cross street that lies ahead and that is of less relevance to the driver is displayed, and FIG. 1B shows a map view depicting the situation where a cross street changes its name at an intersection ahead of the current street.

FIGS. 2A and 2B are display examples involved in the present invention, wherein FIG. 2A shows an example of navigation screen on which the current street that the vehicle is running is displayed, and FIG. 2B shows a name of next cross street in addition to the current street.

FIGS. 6A-6F are schematic diagrams showing a situation involving a double-digitized road as to which cross street is to be selected and displayed as a meaningful cross street in the present invention where FIGS. 6A-6C are directed to various situations of cross streets that are unnamed, and FIGS. 6D-6F are directed to various situations of cross streets that are named.

FIGS. 7A-7I are schematic diagrams showing which street name is to be selected and displayed as a meaningful cross street in accordance with the present invention where FIG. 7A show various situations of cross streets each involving two or more road links, and FIGS. 7B-7I show display examples that correspond to the situations of cross street shown in FIG. 7A.

FIG. 8A shows a process of the present invention mainly related to the situation of double-digitized road shown in FIGS. 6A-6F, and FIGS. 8B and 8C show processes of the present invention related to the situation of FIGS. 7A-7I for determining whether an upcoming cross street is meaningful and which street name should be displayed.

DETAILED DESCRIPTION OF THE PREFERRED EMBODIMENT

The method and apparatus for determining and displaying a meaningful next cross street on a navigation system is explained in detail with reference to the accompanied drawings. The present invention is designed to analyze the current street on which the vehicle is running for up to a certain distance to find relevant cross streets. In order to determine whether a particular cross street is meaningful to the user and which street name is to be displayed for the cross street, the navigation system evaluates various factors that include the information regarding how the road segments are interconnected at the cross street, the name of the road segments that comprise the cross street, the current vehicle position and driving direction, etc.

Thus, the method and apparatus of the present invention is able to provide the meaningful information on the next cross street thereby avoiding to display a known or unknown name of meaningless cross street, thereby avoiding to distract the safe driving. It should be noted that the present invention is described mainly for the case where the method and apparatus is applied to a vehicle navigation system, but the method and apparatus under the present invention can be implemented to other devices, such as portable devices or personal computers.

Figure 1A:
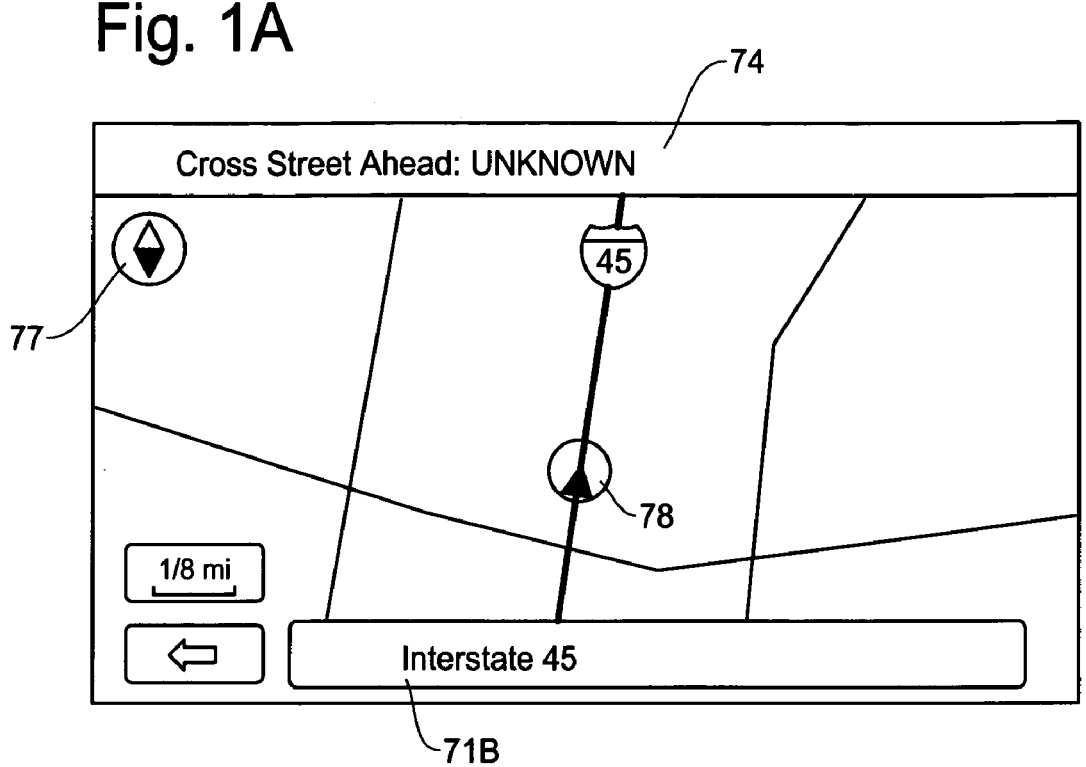
FIGS. 1A and 1B are schematic diagram showing the problems associated with the conventional technology where
Figure 1B:
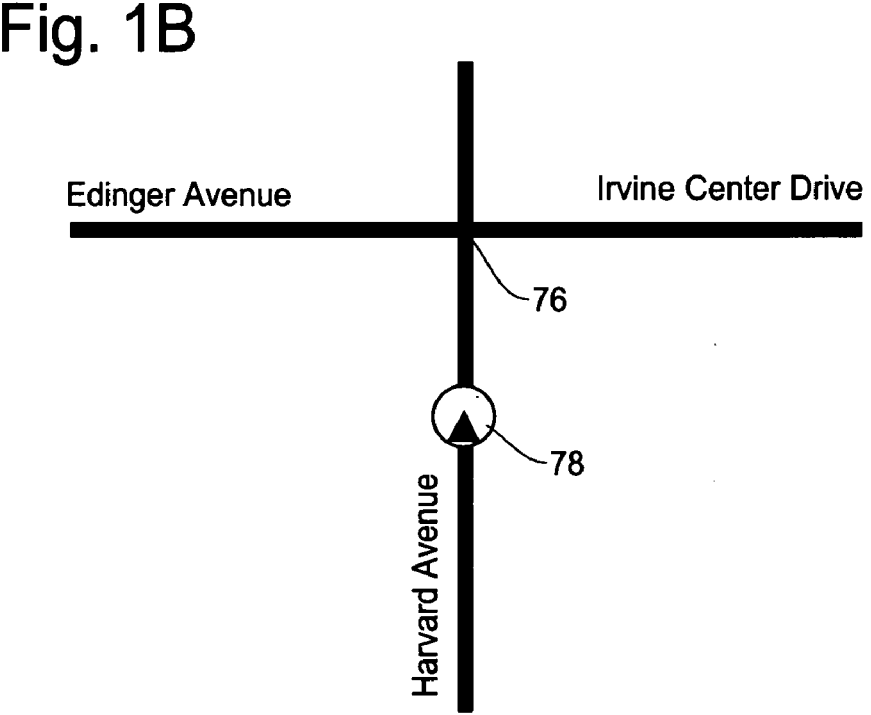
Figure 2A:
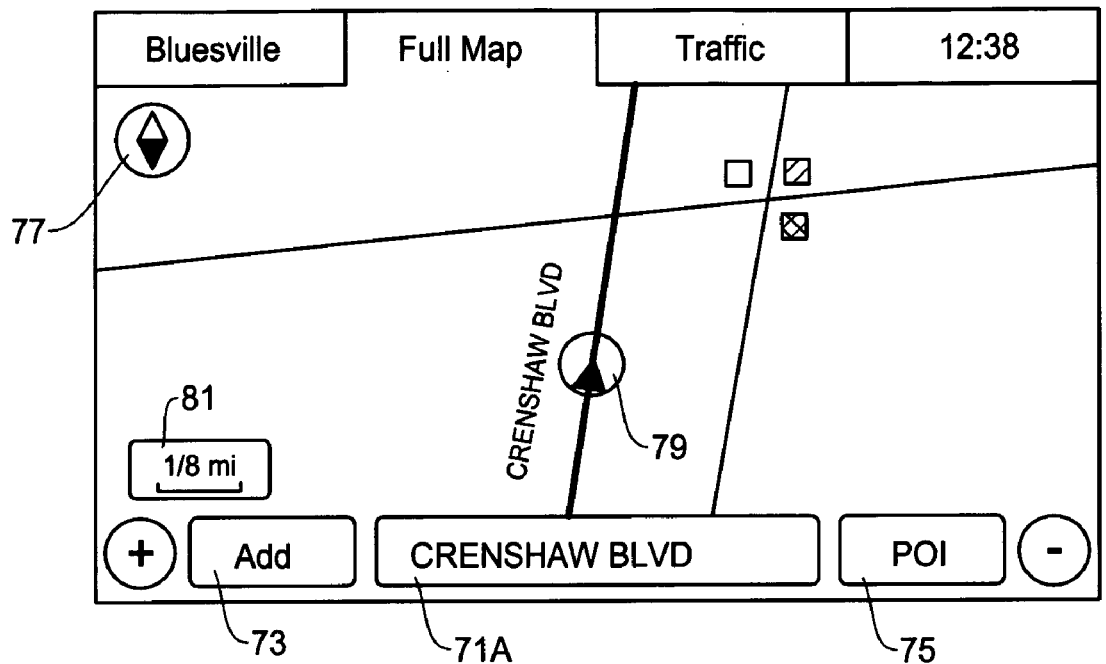
Figure 2B:
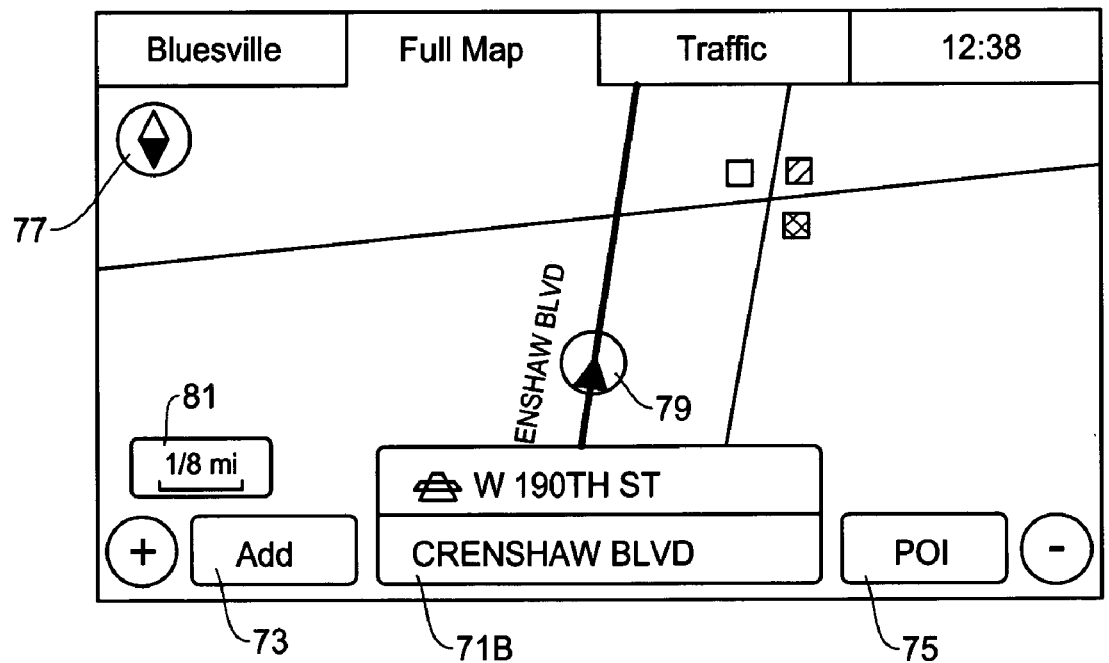

FIGS. 2A and 2B show the display examples associated with the present invention for displaying the information on the next cross street. In the examples of FIGS. 2A and 2B, a display screen includes a scale indicator 81 to indicate a map scale, a compass 77 to indicate an orientation such as a North direction, an "Add" button 73 to add a location, a "POI" button 75 to activate a POI search function, and a location information indicator 71A that indicates a street name. A vehicle position indicator 79 is shown on the map to indicate the current vehicle position on the map image. The text box of the location information indicator 71A shows name of the street on which the vehicle position indicator 79 is illustrated.

In this example, the location information indicator 71A indicates that the vehicle is currently traveling on the street named "Crenshaw Blvd". In FIG. 2B, as the vehicle approaches a cross section, the navigation system will show the name of the cross street. In this example, along with the current street name, the expected cross street name "W 19TH ST" is shown in the location information indicator (text window) 71B at the bottom of the screen.

Figure 5A:
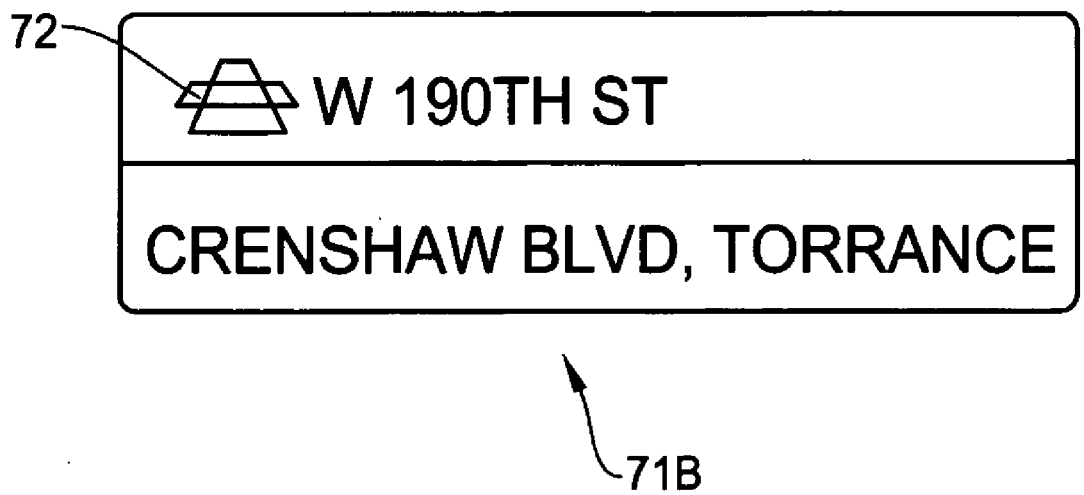
FIGS. 5A and 5B are enlarged views of the location information indicator used in the example of FIG. 2B under the present invention where the name of the cross street is known in FIG. 5A, and the name of the cross street is unknown in FIG. 5B.
Figure 5B:
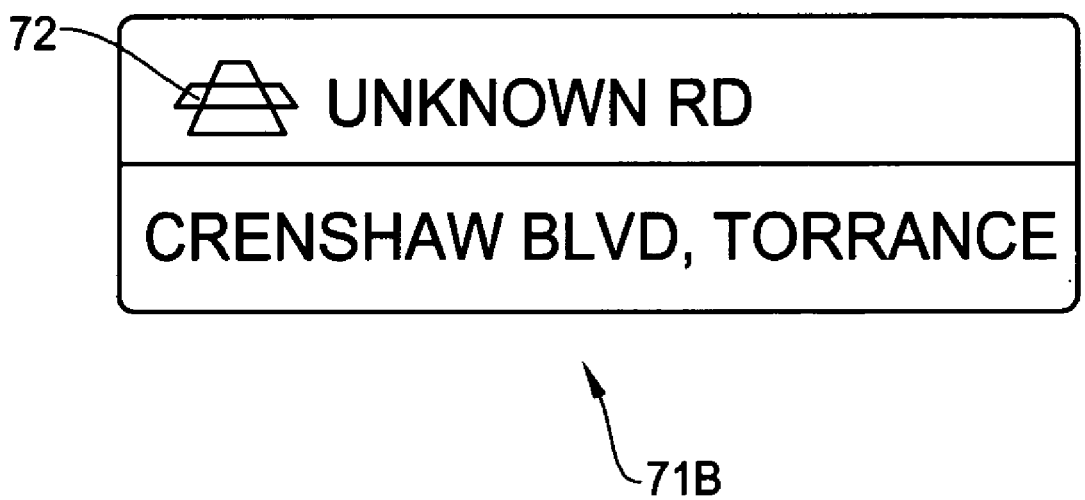

An example of enlarged view of the location information indicator 71B is illustrated in FIG. 5A. In the location information indicator 71B, a cross street icon 72 is used at the head of the name of the next cross street to indicate a name of upcoming meaningful cross street. In this example, the upper area of the location information indicator 71B shows the names of the upcoming street name, and the lower area of the location information indicator 71B shows the street that the vehicle is currently running thereon. FIG. 5B shows an example of the location information indicator 71B when the next cross street does not have a name by indicating as "UNKNOWN".

Figure 3A:
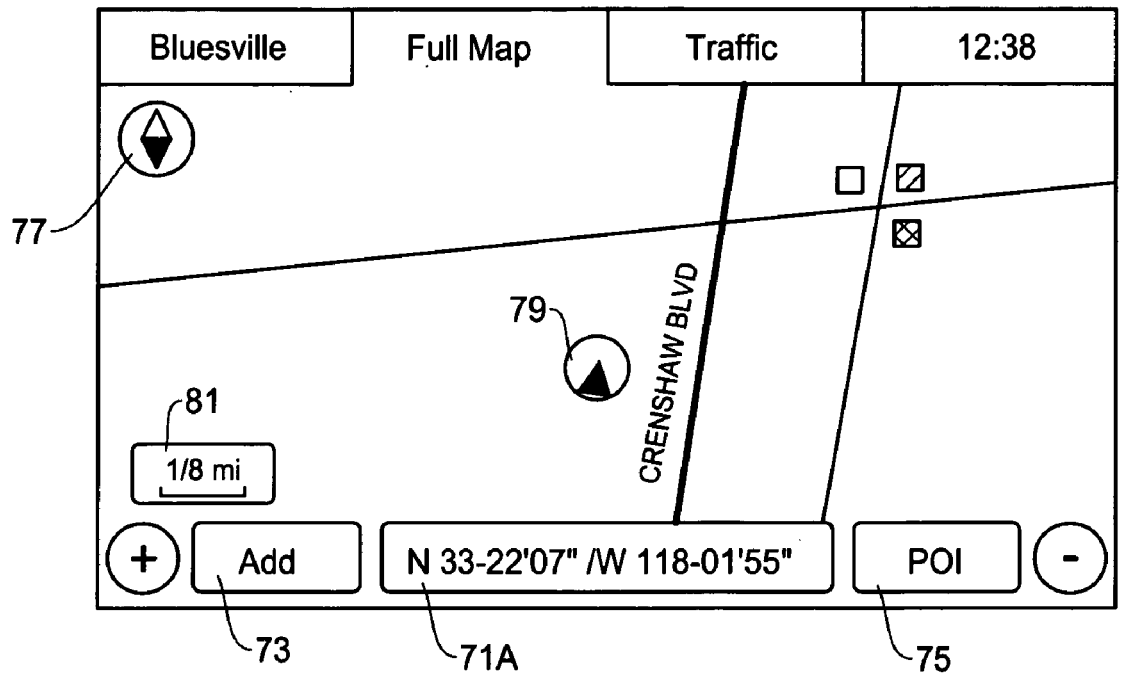
FIGS. 3A and 3B are display examples involved in the present invention wherein the vehicle is located in a non-digitized area (off-road) and information of the vehicle location is displayed where the information shown in FIG. 3B is more detailed than that of FIG. 3A.
Figure 3B:
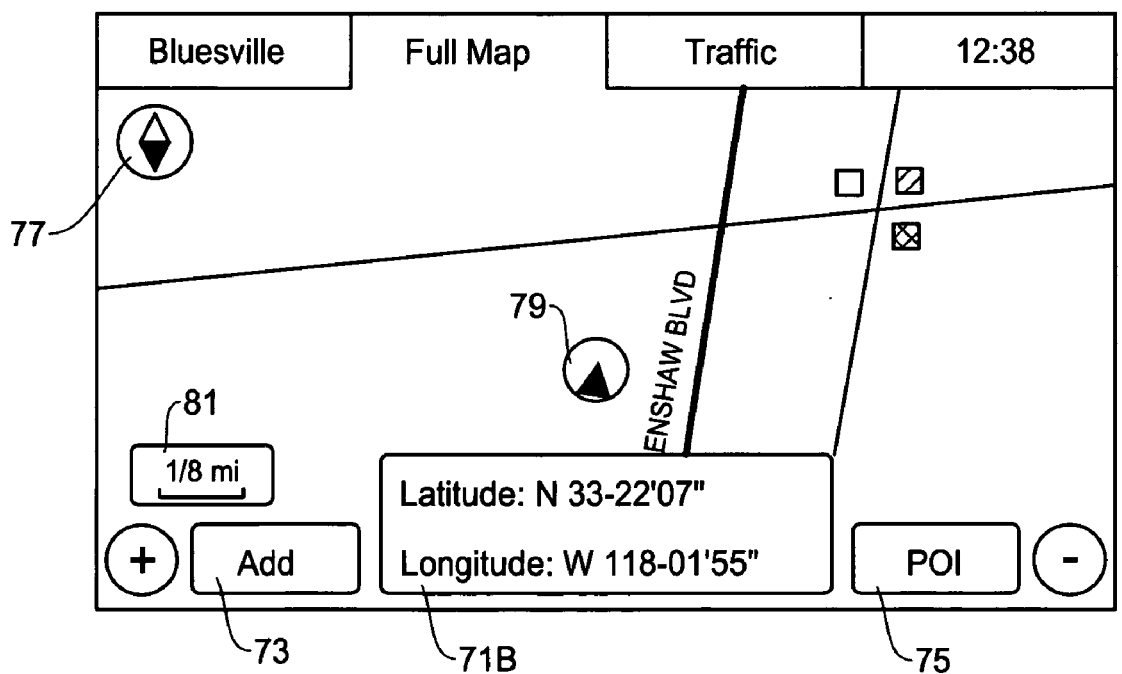

The location information indicator 71 (71A, 71B) may also show other geographic information relevant to the current position of the vehicle. FIGS. 3A and 3B are display examples showing another example for using the location information indicator 71 wherein the vehicle is not located on a road segment. Such a situation arises when the vehicle is currently located in an area with no road (off road) such as a desert, mountain, etc., or in a parking area, a shopping mall, a sports stadium, etc.

In such a case, the location information indicator shows the current position of the vehicle by the longitude and latitude data (absolute location) since there is no road associated with the current position. In the example of FIG. 3A, the location information indicator 71A indicates the absolute location of the vehicle in an abbreviated manner. In the example of FIG. 3B, the location information indicator 71B shows the absolute location of the vehicle in a manner that is more detailed than that of FIG. 3A.

Figure 4A:
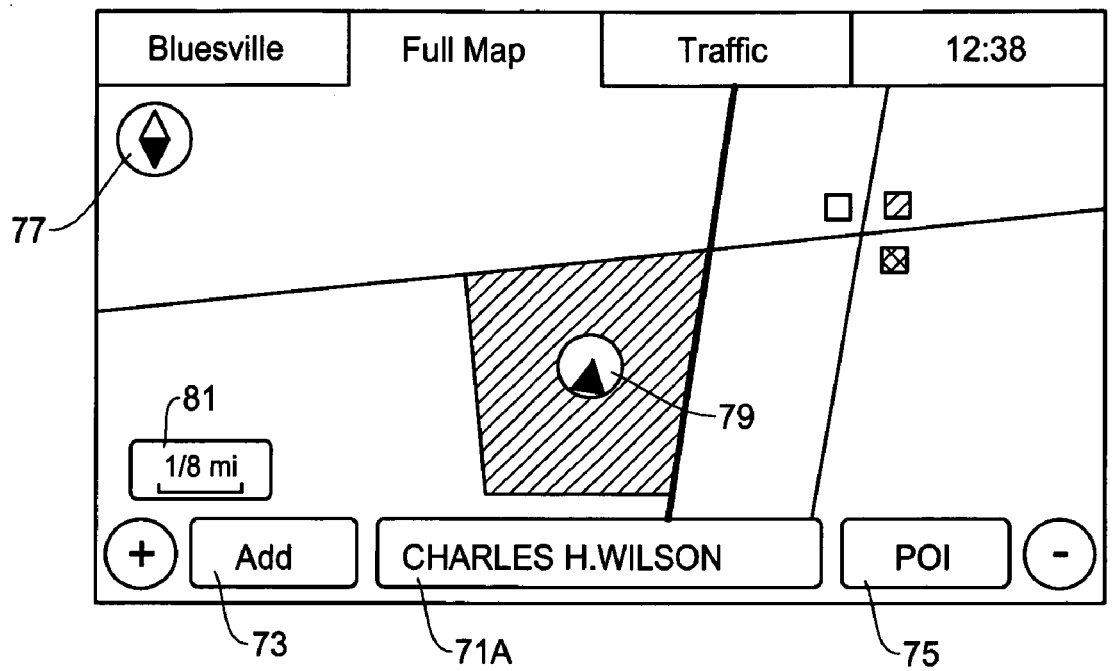
FIGS. 4A and 4B are display examples involved in the present invention wherein the vehicle is located in an area defined by polygon data and information of the vehicle location is displayed where the information shown in FIG. 4B is more detailed than that of FIG. 4A.
Figure 4B:
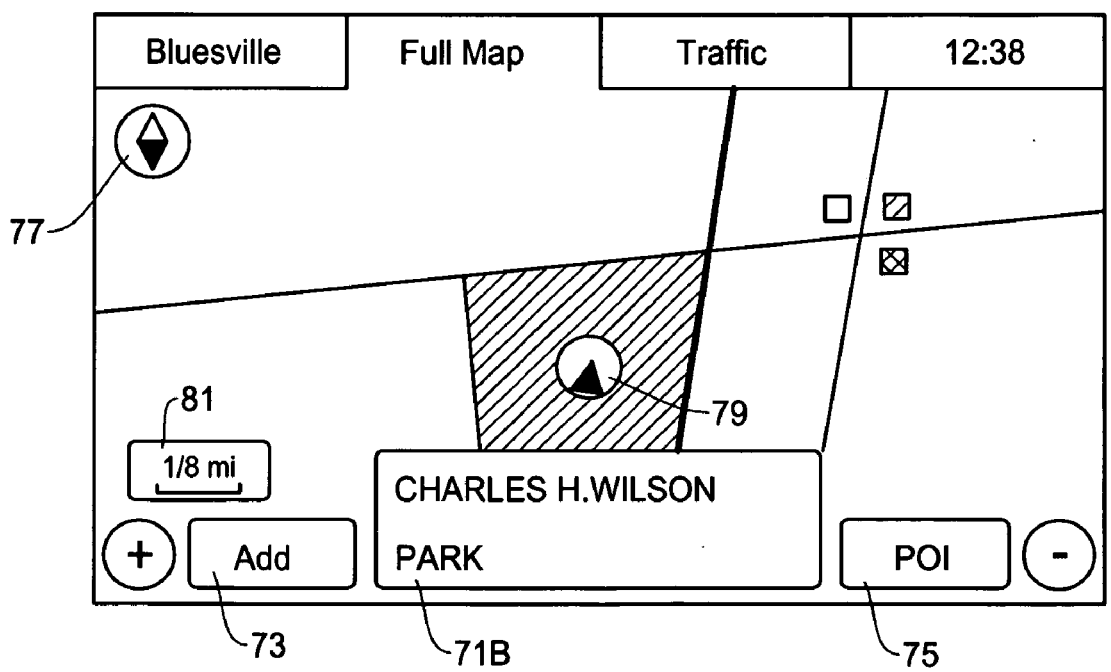

FIGS. 4A and 4B are display examples showing a further example for using the location information indicator 71 wherein the vehicle is located within a relatively large area, i.e., away from streets. In the map data commonly used in navigation systems, such large areas are typically defined by polygon data rather than road segment data. As is known in the art, each road in the map data is defined a plurality of road segments each being a line where a start position and an end position are defined by latitude and longitude data. In contrast, a large two-dimensional (polygon) structure such as an airport, a shopping mall, a large building, a pond, a lake, a stadium, etc., are defined by polygon data (two dimensional data) where each corner point or shape point of the polygon is defined by latitude and longitude data.

In the example of FIGS. 4A and 4B, since the vehicle is currently located away from streets, it is not possible to describe the current vehicle position by the street name and house number. Thus, in this case, a polygon name in which the vehicle is located is shown on the location information indicator 71. In this example, "Charles H. Wilson Park" is listed as the name of the polygon area where the vehicle is currently located, the location information indicator 71B in FIG. 4B indicates the information in a manner that is more detailed than the location information indicator 71A in FIG. 4A.

Figure 6A:
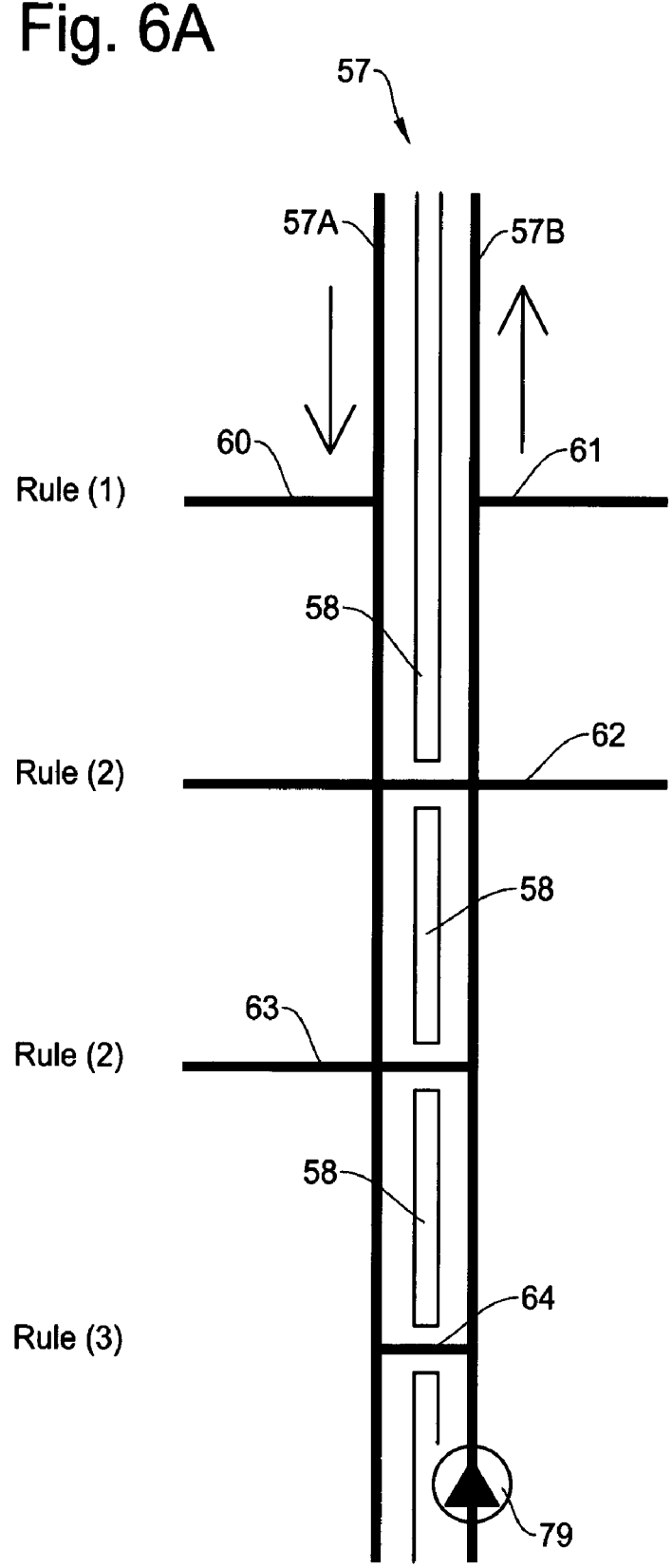

More specific examples of the way for determining the meaningful next cross street is described with reference to a schematic street view shown in FIGS. 6A and 6D and display examples of FIGS. 6B-6C and 6E-6F. As noted above, there are may types of cross street in the map data, and the present invention is to determine whether the upcoming cross street is meaningful for the user when displayed on the screen. In FIGS. 6A and 6D, the vehicle position indicator 79 indicates the current position of the vehicle, and the thick lines represent the road segments.

In this example, a current street 57 on which the vehicle is running is a unique type of street that is called a double-digitized road in the industry. A double-digitized road is a divided road with at least one lane traveling in each of two directions, for which the opposite directions of travel are represented in the map database as different road segments. In this example, the current street 57 has two one-way street lines 57A and 57B of opposite directions. The street line 57A allows vehicles to move to the downward direction of the drawing and the street line 57B allows vehicles to move to the upward direction, i.e., opposite to that of street line 57A. Typically, center dividers 58 are provided between the street line 57A and street line 57B where such center dividers are typically configured by cemented areas with trees, flowers, etc. therein.

Figure 6B:
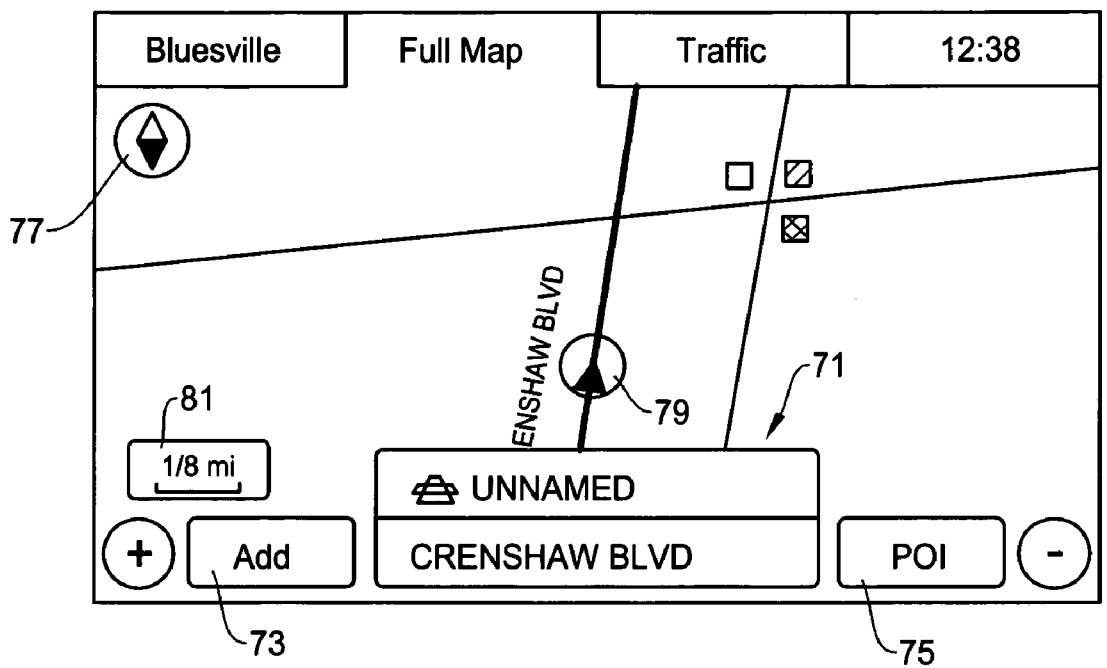
Figure 6C:
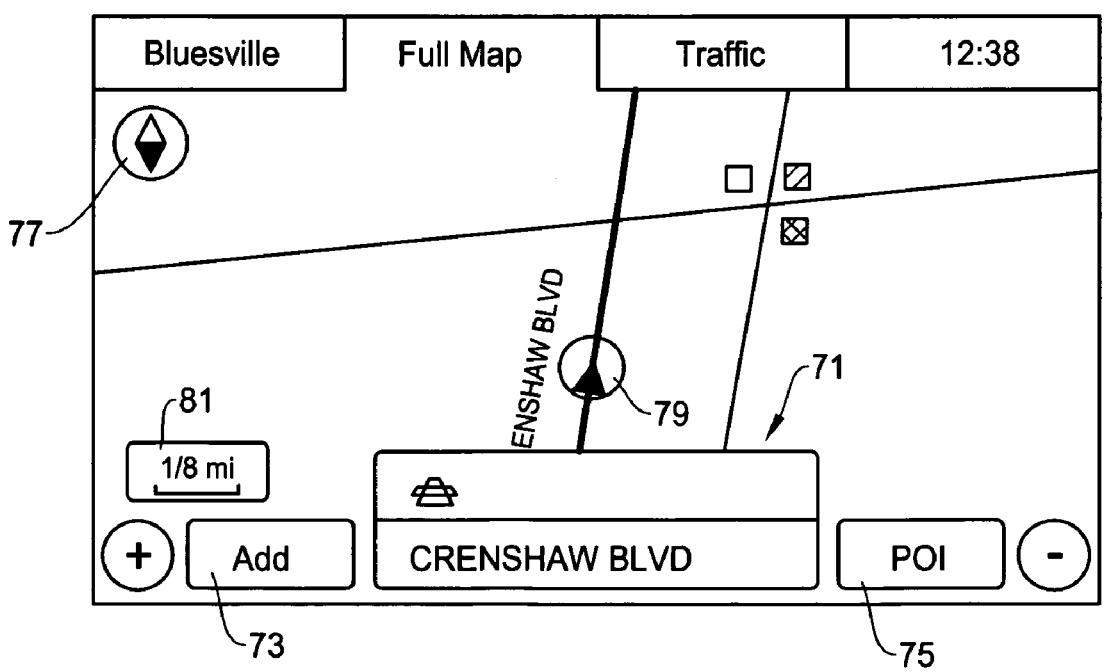

In the example of FIGS. 6A-6C, there are five cross streets 60-64 that are connected to the current street 57 in manners different from one another. Further in the example of FIGS. 6A-6C, it is assumed that each of the cross streets 60-64 does not have its name. The navigation system under the present invention will determine whether the upcoming cross street is meaningful for the user and if so, displays the information on the cross street by showing the message "UNNAMED" on the screen. This determination is made based on the following rules:

(1) If a cross street connects only one of the two street lines 57A and 57B of the double-digitized road 57 that is accessible by the user because of the current vehicle position and driving direction, such a cross street should be displayed. In other words, a cross street that is connected only to the street line that is not accessible to the user should not be displayed.

(2) If a cross street connects the two street lines 57A and 57B of the double-digitized road 57, and if the cross street is also linked to a road segment that departs away from the double-digitized road, such a cross street should be displayed.

(3) Otherwise, a cross street should not be displayed, i.e, a cross street whose only purpose is to connect the street lines 57A and 57B is deemed to be meaningless for the user.

Applying the rules described above, the navigation system is able to determine which cross street should be displayed as a meaningful cross street. Each numeral with a parenthesis provided at each cross street at the left side of FIG. 6A corresponds to the number of the above listed rule. With respect to the cross street 60, since the cross street 60 is connected only to the street line (one-way) 57A which is not accessible by the user because of the current vehicle position and driving direction. Thus, the cross street 60 is not meaningful under the rule (1), thus not displayed on the navigation screen.

With respect to the cross street 61, since the cross street 61 is connected only to the street line 57B, i.e., does not connect the two street lines 57A and 57B. Further, the street line 57B is accessible by the user because the current vehicle position 79 is on the street line 57B, thus the rule (1) is applicable. In other words, because it is possible that the cross street 61 can lead the user to a particular meaningful location apart from the current street 57, this cross street is meaningful to the user and thus be displayed on the navigation screen.

Likewise, the rule (2) is applicable for the cross street 62, because although the cross street 62 connects the two street lines 57A and 57B of the double-digitized road 57, it is also connected to the road segment that goes away (i.e., extends in the right and left directions) from the double digitized road. Thus, the cross street 62 is a meaningful cross street because it can lead the user to a particular meaningful location apart from the current street 57. The rule (2) also applies to the cross street 63 which connects the two street lines 57A and 57B and also goes away from the current street 57, i.e., extends in the left direction.

Thus, the navigation system shows the information on the cross street 61, 62, or 63 by indicating "UNNAMED" in the location information indicator 71 as shown in FIG. 6B, even though each of the cross streets 61-63 itself does not have a name, thereby notifying the user that the unnamed cross street is coming. With respect to the cross streets 60 and 64, however, the navigation system judges that these cross streets are meaningless. This is because the cross street 60 is not accessible by the vehicle because of the current position and direction, and the cross street 64 merely connects the two street lines 57A and 57B of the double-digitized road 57. Thus, as shown in FIG. 6C, the navigation system does not show the information in the text box of the location information indicator 71 with respect to the cross streets 60 and 64.

As noted above, with respect to the cross streets 60 and 64, the navigation system will not show that these cross streets are coming next since it is not considered to be meaningful cross streets. In addition to the double-digitized road noted above, in real life, this situation may also fall into road links concerning an emergency turning lane on a freeway/highway that is not accessible by general public. The information on a meaningless cross street would create distraction rather than aiding the user, thus, the navigation system will disregard such cross streets.

The cross streets that associated with the double-digitized road 57 described with reference to FIGS. 6A-6C do not have names. However, the present invention for determining whether the upcoming cross street is meaningful for the user is not limited to the situation where the cross street is unnamed. Thus, FIGS. 6D-6F show the situation involving the double-digitized road 57 as to which cross street is to be selected and displayed as a meaningful cross street in the present invention where most of the cross streets have their own names.

The situation shown in FIG. 6D is similar to that of FIG. 6A except that most of the cross streets have their own names. With respect to "West A Street", it is connected only to the street line 57A which is not accessible by the user because of the current vehicle position and driving direction. Thus, "West A Street" is not meaningful under the rule (1), thus not displayed on the navigation screen as shown in FIG. 6F. With respect to "East A Street", since it is connected to the street line (one-way) 57B which is accessible by the user because the vehicle is currently on the street line 57B, this cross street is meaningful under the rule (1). Thus, the navigation system displays the "East A Street" as a meaningful cross street as shown in FIG. 6E.

Figure 7A:
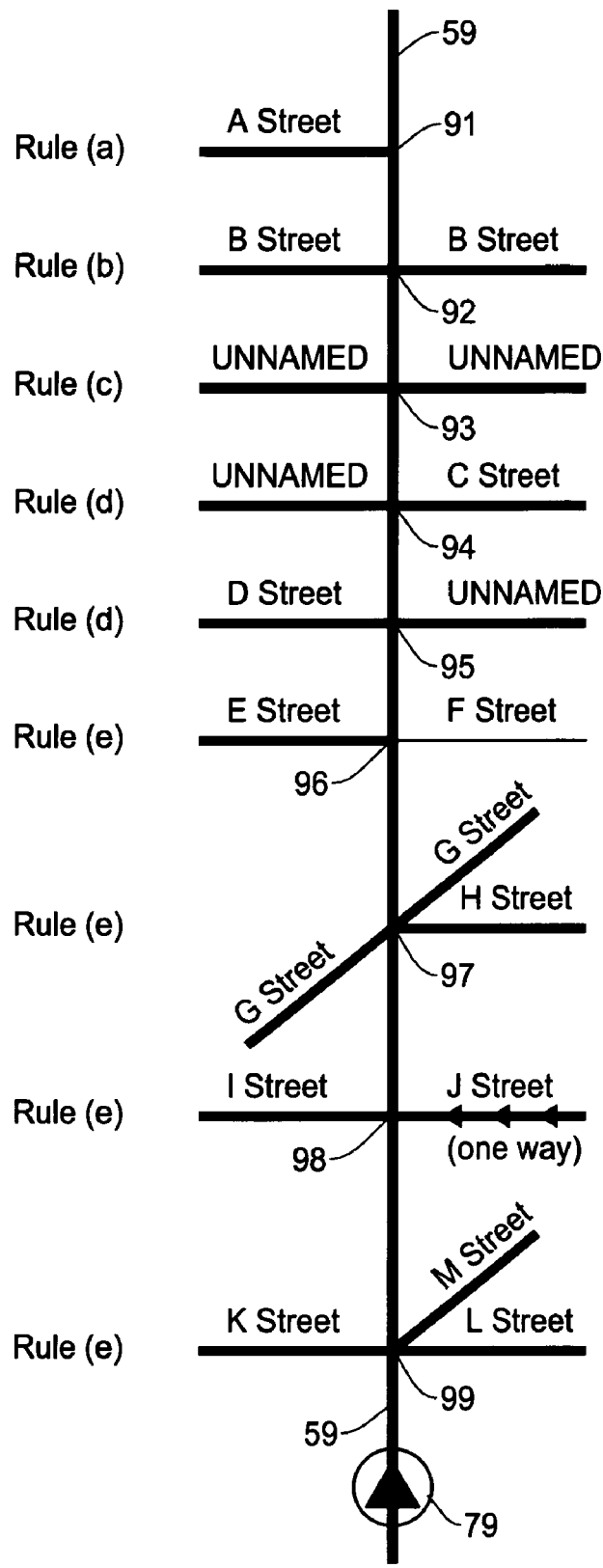

Various types of cross streets exist that require the navigation system to determine which name is most likely to be meaningful to the user. Such a situation arises when, for example, an upcoming cross street is associated with two or more road links (streets) of different names. FIG. 7A is a schematic map view that show various situations of cross streets that intersect with the current street 59 to show how the name of the upcoming cross street to be displayed is determined under the present invention. Unlike the situation of FIGS. 6A-6F, the current street 59 is an ordinary street, thus, it is not limited to the double-digitized road. FIGS. 7B-7I are schematic diagrams showing display examples of the navigation system of the present invention that show the name of the cross street corresponding to the situations of intersections 91-99 in FIG. 7A.

Rules for determining as to which name of the next cross street is to be displayed on the navigation as a meaningful cross street are as follows:

(a) If only one street (road link) is connected to the current street (ahead of the vehicle position 79) to form a cross street, display the street name (if such a street is unnamed, display "UNNAMED"). Assuming two or more road links are connected to form a cross street, display the street name according to the following rules:

(b) If all the road links forming the upcoming cross street share the same cross street name, display the cross street name.

(c) If all the road links forming the upcoming cross street are unnamed, display "UNNAMED".

(d) If one road link is named while the other road link is unnamed, display the street name of the named road link;

(e) If two or more road links are different in the name, use the following priority (sub-rules) to narrow down the street names at each step until one street name is selected to be displayed:

(e)-1 Display the name of road link that constitute the higher or highest functional class.

(e)-2 Display the most commonly used street name among the names of the road links.

(e)-3 Ignore a one-way road link that the vehicle of the user cannot access.

(e)-4 Display the name of road link closest to the current vehicle position of the user.

(e)-5 Display the name of road link on the side of the road on which the vehicle is running (eg. the right hand side in the United States).

Similar to the schematic map view shown in FIGS. 6A and 6D, the schematic map view of FIG. 7A includes reference characters rules (a)-(e) at the left side of each cross street that correspond to the reference characters of the above rules. Each cross street in FIG. 7A intersects with the current street 59 on which the user's vehicle is running where the current vehicle position 79 is marked at the bottom. By applying the above noted rules (a)-(e) to the conditions associated with the intersections 91-99 of FIG. 7A, the name of the upcoming cross street is determined in the following manner.

Figure 7B:
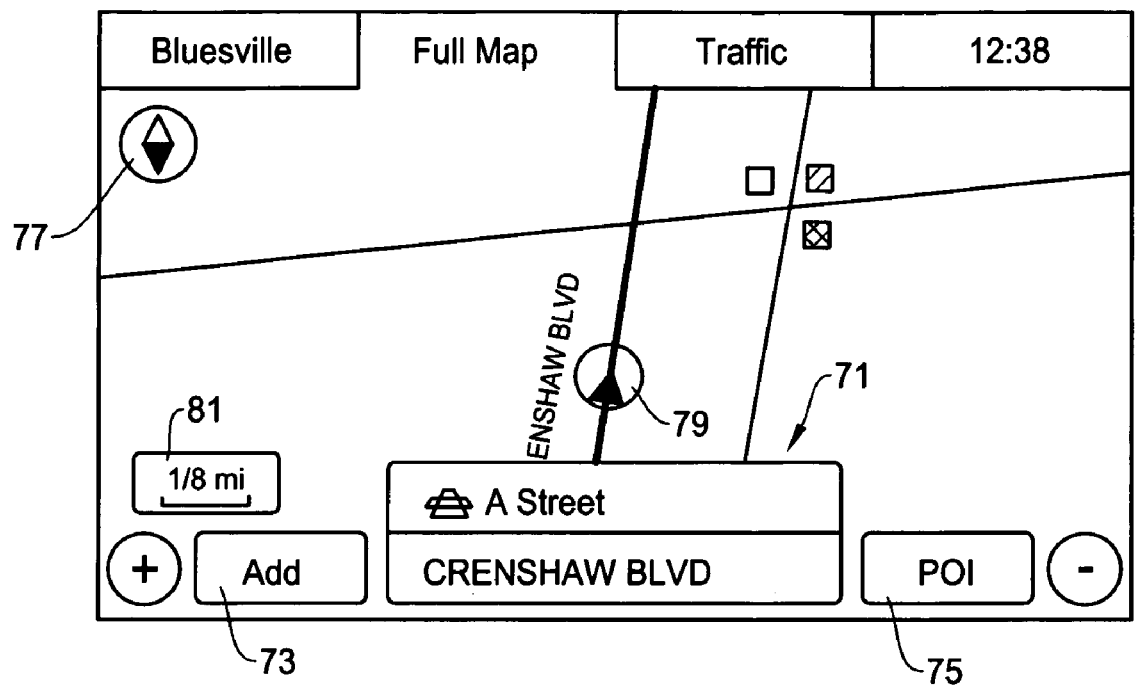

With respect to an intersection 91, only one road link (street) is connected to the current street 59 ahead of the current position 79. Thus, the rule (a) applies to the intersection 91 in which the navigation system determines that the appropriate name of the cross street in this case is "A Street". Accordingly, the street name "A Street" is displayed along with the cross street icon in the location information indicator 71 as shown in FIG. 7B.

Figure 7C:
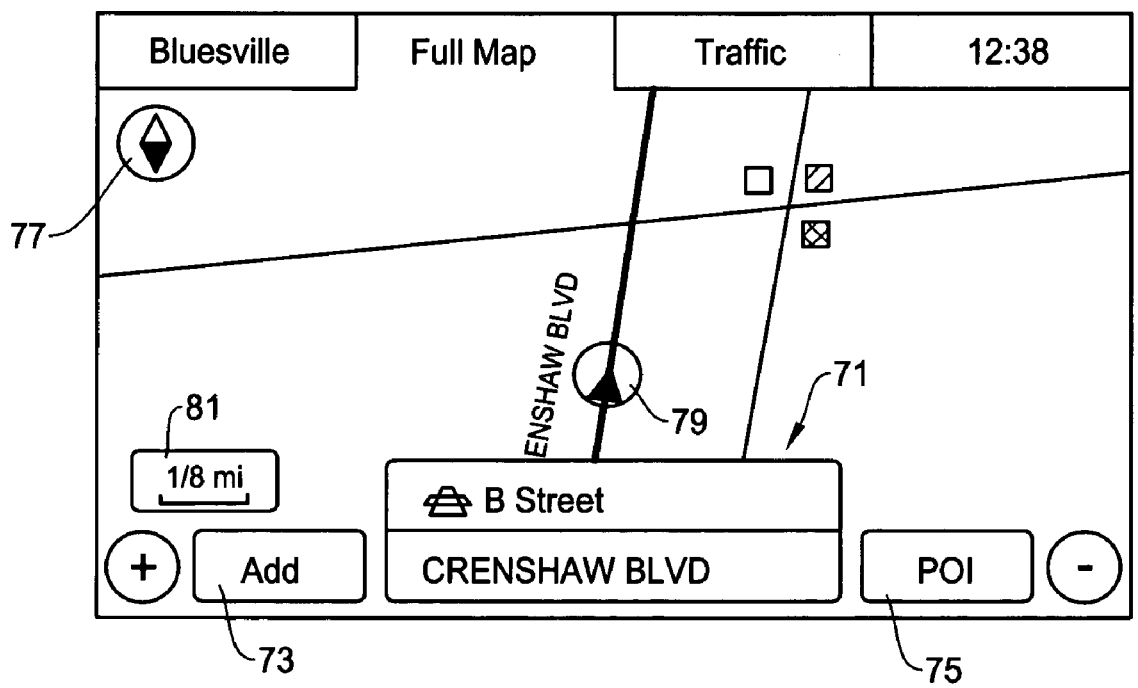

With respect to an intersection 92, two road links (streets) of the same name are connected to the current street 59 ahead of the current position 79. Thus, the rule (b) applies to the intersection 92 in which the navigation system determines that the appropriate name of the cross street in this case is "B Street". Accordingly, the street name "B Street" is displayed along with the cross street icon in the location information indicator 71 on the screen as shown in FIG. 7C.

With respect to an intersection 93, two road links (streets) with no name are connected to the current street 59 ahead of the current position 79. Thus, the rule (c) applies to the intersection 93 in which the navigation system determines that the appropriate name of the cross street in this case is "UNNAMED". Accordingly, the street name "UNNAMED" is displayed along with the cross street icon in the location information indicator 71 on the screen as shown in FIG. 7D.

With respect to an intersection 94, two road links (streets) one with no name and the other with a name are connected to the current street 59 ahead of the current position 79. Thus, the rule (d) applies to the intersection 93 in which the navigation system determines that the appropriate name of the cross street in this case is the actual name "C Street". Accordingly, the street name "C Street" is displayed along with the cross street icon in the location information indicator 71 on the screen as shown in FIG. 7E. The condition of an intersection 95 is the same as that of the intersection 94, thus, the street name "D Street" will be selected and displayed.

With respect to an intersection 96, two road links (streets) of different names are connected to the current street 59 ahead of the current position 79. Thus, the rule (e) applies to the intersection 96 in which the navigation system determines that the appropriate name of the cross street. Here, it is assumed that a functional class of "E Street" is higher than that of "F Street". The functional class of street refers to the hierarchical category of street where the functional class is higher for a major street such as a freeway, toll road, etc., than a smaller street such as a residential street.

Figure 7F:
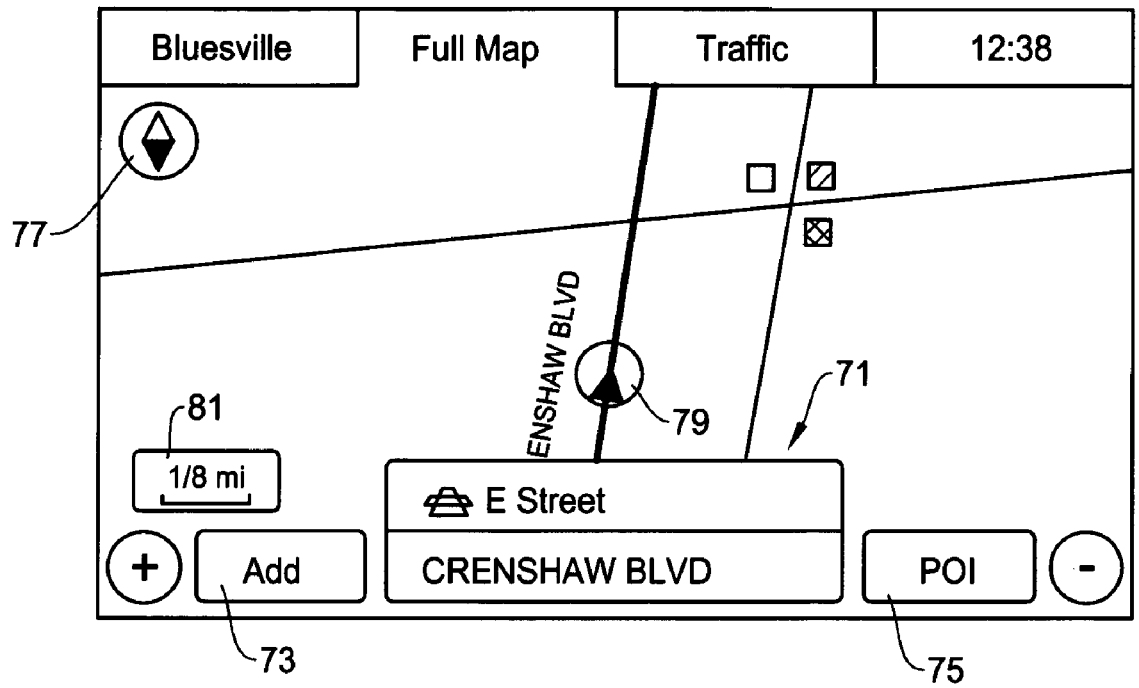

Since the "E Street" is higher in the functional class than the "F street", the sub-rule (e)-1 is applicable to the situation of the intersection 96. This rule is based on the assumption that a higher class street such as a freeway, major street, etc., is ordinarily more meaningful and important to an average user. Accordingly, the street name "E Street" is displayed along with the cross street icon as a meaningful next cross street in the location information indicator 71 on the screen as shown in FIG. 7F. Thus, according to this rule, in the case where three or more road links are involved, the street name of the highest functional class will be selected.

Figure 7G:
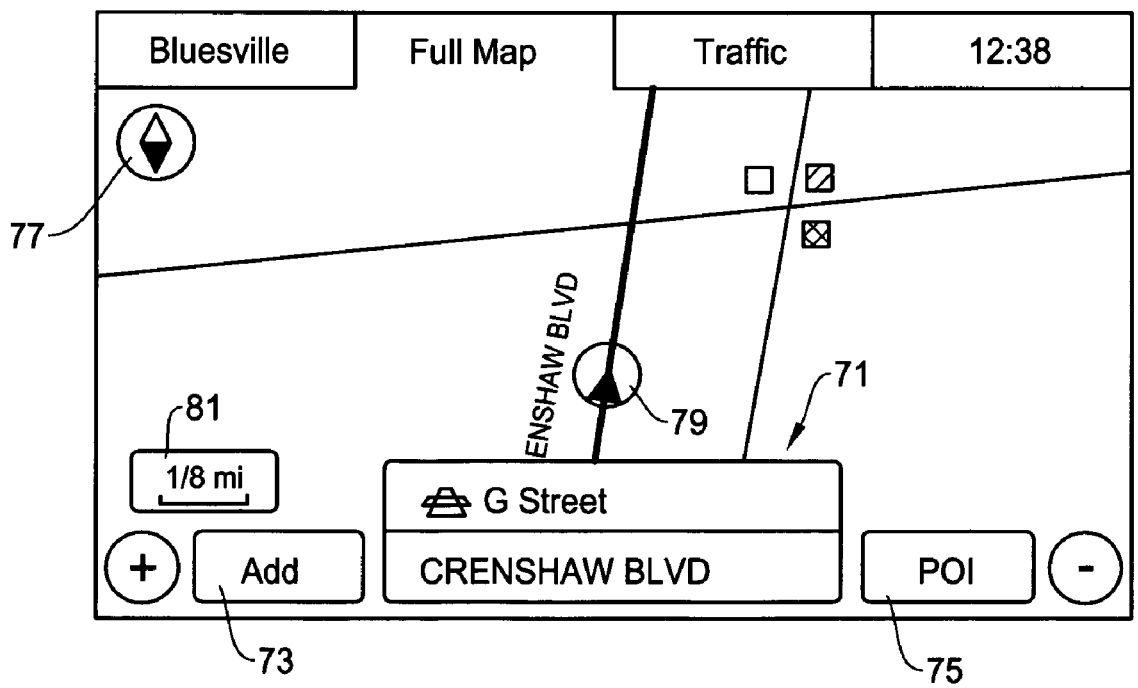
Figure 7H:
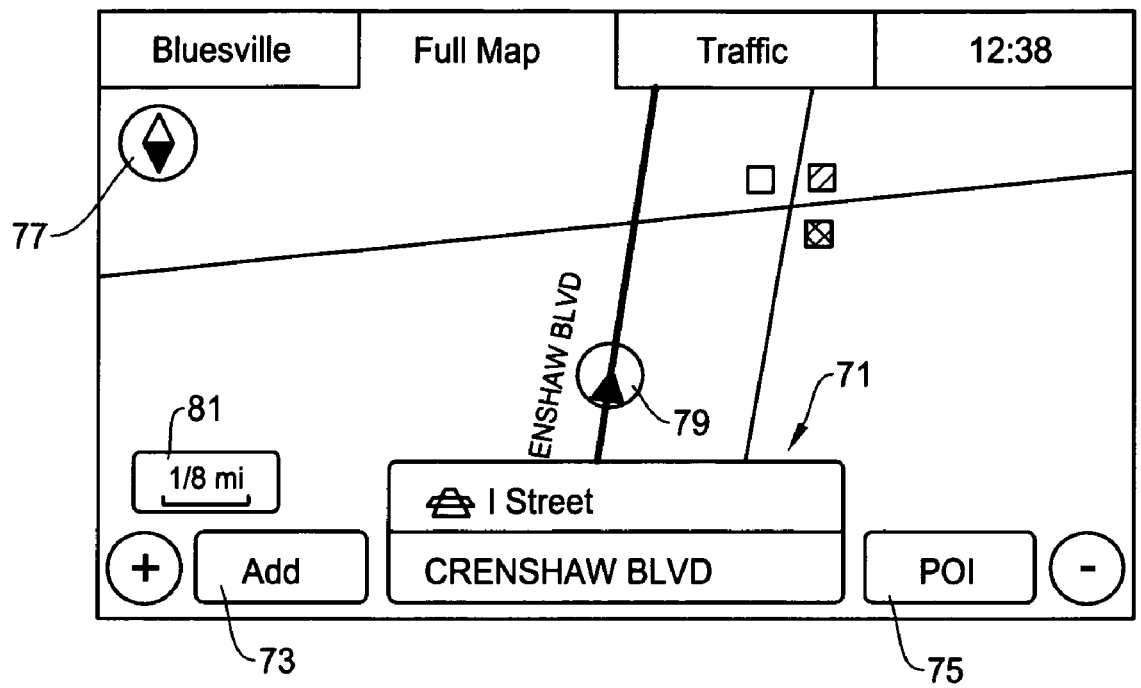

With respect to an intersection 97, three road links of different name and the same function class are connected to the current street 59 ahead of the current position 79. In this example, two road links are named as "G Street" while the remaining road link is named as "H Street", thus it is considered that the street name "G Street" is more commonly used than the street name "H Street". Thus, by applying the sub-rule (e)-2 noted above, the street name "G Street" will be selected as the meaningful next cross street. Accordingly, the street name "G Street" is displayed along with the cross street icon in the location information indicator 71 on the screen as shown in FIG. 7G.

Figure 7I:
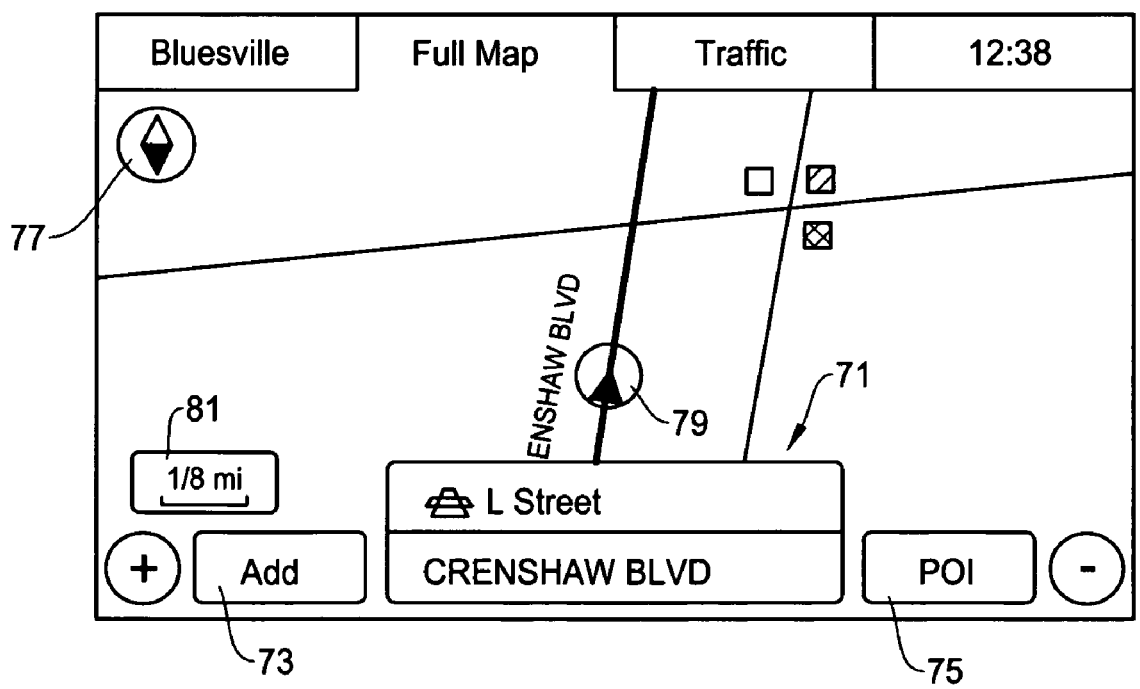

With respect to an intersection 98, two road links of the different names and the same functional class are connected to the current street 59 ahead of the current position 79. Further, there is no street name that is more commonly used than the other, thus the sub-rules (e)-1 and (e)-2 are not applicable. However, it is assumed that the "J Street" is a one-way street that the user's vehicle is not able to access as shown by directional arrows thereon. Thus, the sub rule (e)-3 noted above is applicable to the intersection 98 since the rule states to ignore one-way link that is not accessible. Thus, the street name "I Street" will be selected as the meaningful next cross street. Accordingly, the street name "I Street" is displayed along with the cross street icon in the location information indicator 71 on the screen as shown in FIG. 7I.

With respect to an intersection 99, three road links of different names and the same function class are connected to the current street 59 ahead of the current position 79. Further, there is no street name that is more commonly used than the other and there is no one-way street, thus the sub-rules (e)-1, (e)-2 and (e)-3 are not applicable. Under the sub-rule (e)-4 noted above, a name of the street that is closest to the current vehicle position will be selected. Thus, "M Street" is eliminated as a candidate because it is not the closest to the current vehicle position.

The remaining road links "K Street" and "L Street" are considered to be same distance or equally closest to the current vehicle position 79. Under the sub-rule (e)-5, the name of road link on the side of the street on which the vehicle is running is selected. It is assumed in this example that the vehicle is running on the right-hand side of the street under the traffic regulation.

Thus, by applying the sub-rule (e)-5 noted above, the street name "L Street" will be selected as the meaningful next cross street. Accordingly, the street name "L Street" is displayed along with the cross street icon in the location information indicator 71 on the screen as shown in FIG. 7I. In the jurisdictions with the traffic direction opposite to the above example, i.e, a vehicle travels on the left-hand side of the street, like Japan, United Kingdom, etc., "K Street" will be selected.

Figure 8A:
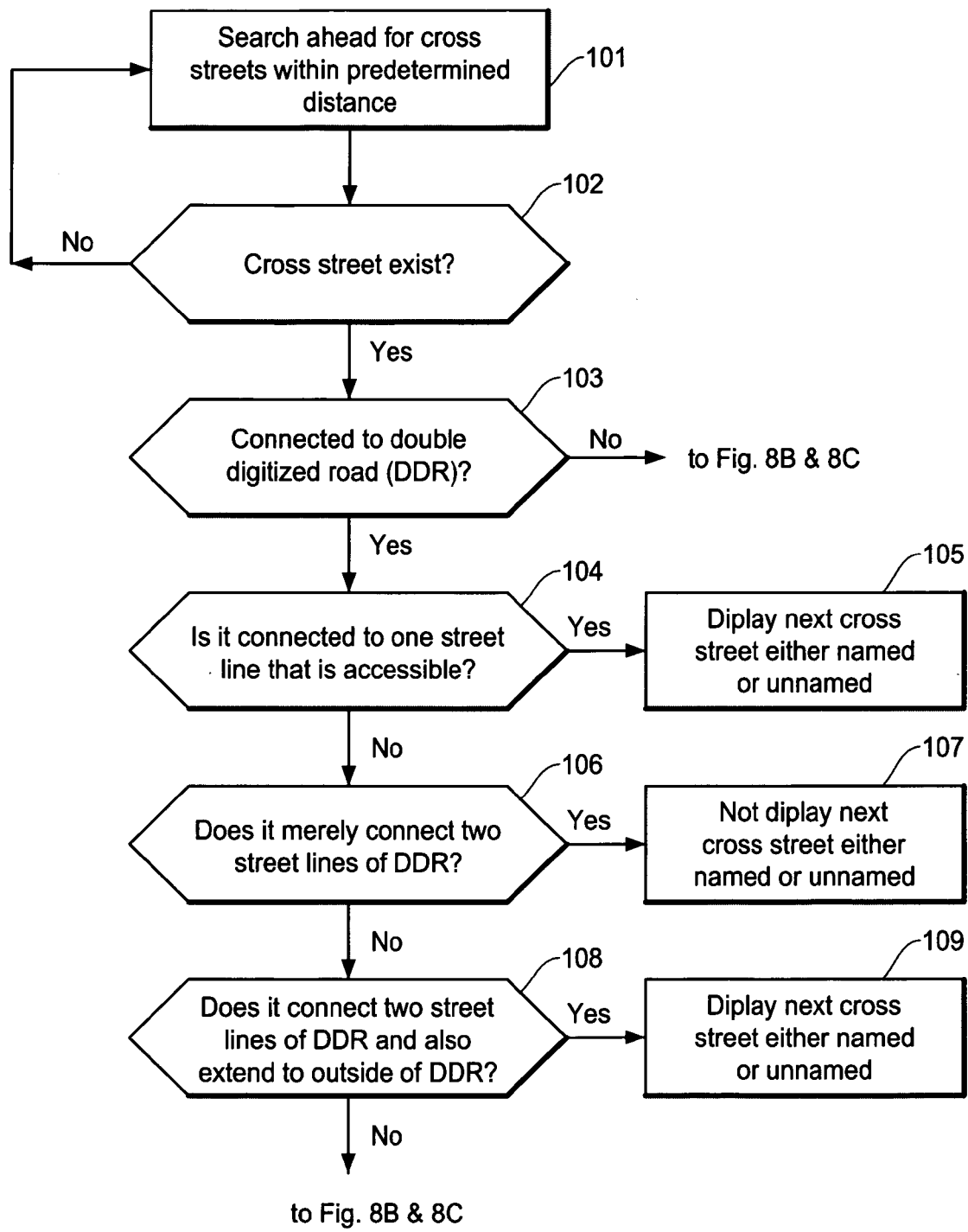
FIGS. 8A-8C are flow charts showing the basic operational steps of the present invention where
Figure 8B:
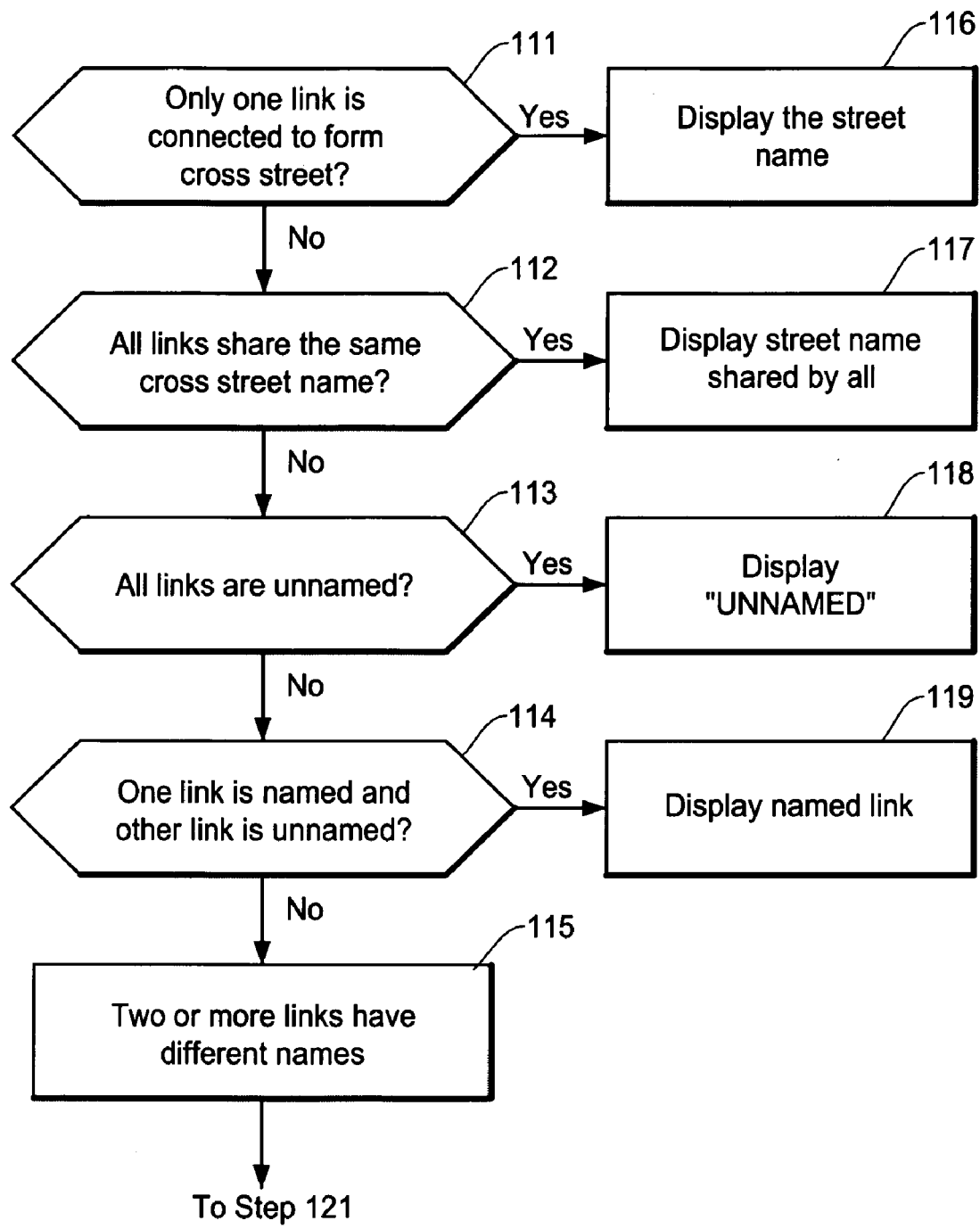
Figure 8C:
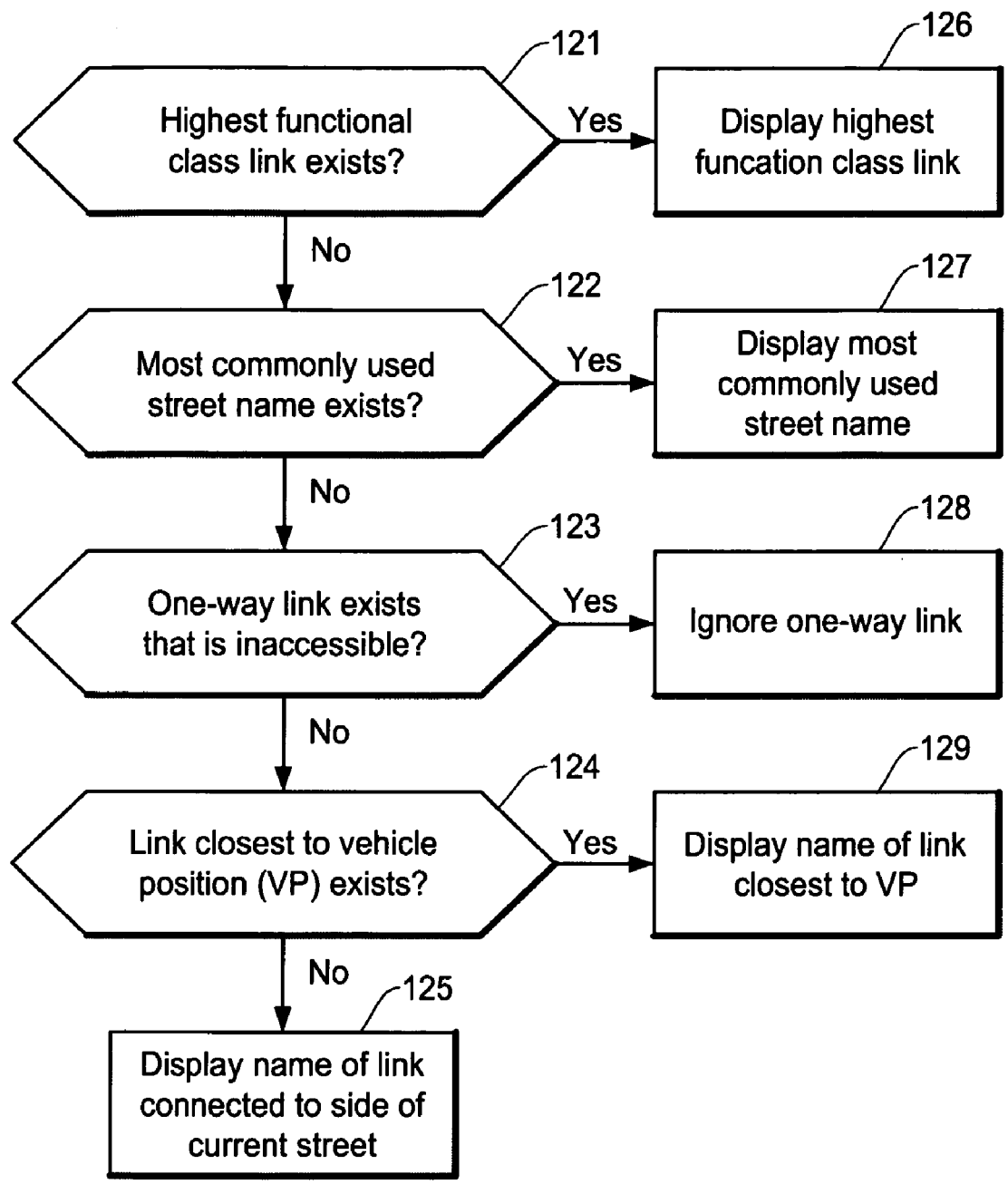

FIGS. 8A to 8C are flow charts showing the basic operational steps of the present invention for determining which cross street is meaningful and which street name should be displayed as the meaningful next cross street. The flow chart of FIG. 8A is mainly directed to the operational process corresponding to that of FIGS. 6A-6F involving the double-digitized road. The flow charts of FIGS. 8B and 8C are directed to the operational process corresponding to that of FIGS. 7A-7I for determining as to which street name should be displayed.

With respect to the flow chart of FIG. 8A, in the first step 101, through the map data, the navigation system will search ahead the current street 57 (FIGS. 6A and 6D) on which the vehicle is traveling within a certain distance range, for example, up to 50 miles to find whether cross streets exist. In the step 102, the navigation system checks whether a cross street exists, and if so, retrieves the data concerning the cross street and proceeds to the next step 103. Until the cross street is found on the current street 57, the navigation system repeats the steps 101 and 102 noted above.

In the step 103, the navigation system determines whether the detected cross street is connected to a double-digitized road. In other words, the navigation system determines whether the current street 57 is a double-digitized road (DDR) which is typically configured by two one-way street lines 57A and 57B as shown in FIGS. 6A and 6D. If the current street is not a double-digitized road, the process moves to the steps shown in FIGS. 8B and 8C for further process of the present invention.

If the current street is a double-digitized road, the navigation system proceeds to the step 104 and evaluates the retrieved data where it is determined whether the cross street is connected (linked) to only one of the street lines 57A-57B that is accessible by the user's vehicle. As noted above, in the example of FIG. 6A, the cross street 61 is accessible while the cross street 60 is not accessible. Thus, in the step 105, the navigation system displays the cross street 61 by its name or if it is unnamed by "UNNAMED", while the navigation system will not display the cross street 60.

If the cross street is not connected to only one of the two street lines 57A and 57B of FIGS. 6A or 6D, the navigation system determines whether the cross section merely connects the two street lines 57A and 57B in the step 106. In the example of FIG. 6A, the cross street 64 merely connects the two street lines 57A and 57B of the double-digitized road 57 which is not meaningful to the user. Thus, in the step 107, the navigation system will not display the cross street 64.

In the step 108, the navigation system further examines whether the cross street that connects the two street lines 57A and 57B of the double-digitized road 57 is further extended toward the outside of the double-digitized road 57. In the example of FIG. 6A, the cross streets 62 connects the two street lines 57A and 57B but also extends toward both the left and right directions from the double-digitized road 57. Also, the cross street 63 connects the two street lines 57A and 57B but also extends toward the left from the double-digitized road 57. Thus, in the step 109, the navigation system will display the cross street 62 or 63 by its name or if it is unnamed, by "UNNAMED".

The flow charts of FIGS. 8B and 8C are directed to the operational process corresponding to that of FIGS. 7A-7I for determining whether an upcoming cross street is meaningful, and if so, which street name should be displayed. FIG. 8B shows the operational process of the present invention that is related to the intersections 91-95 in FIG. 7A. FIG. 8C shows the operational process of the present invention that is related to the intersections 96-99 in FIG. 7A.

With respect to the process of FIG. 8B, in the step 111, the navigation system determines whether the cross section (intersection) is formed by only one road link connected to the current street. If so, the navigation system displays the street name of this link on the screen in the step 116 (rule (a)). This condition corresponds to the intersection 91 in FIG. 7 where only one road link "A Street" intersects with the current street 59.

If the answer in the step 111 is negative, the process moves to the step 112 where the navigation system checks whether all road links share the same street name. If all the road links have the same street name, the navigation system displays the street name that is shared by all the road links in the step 117 (rule (b)). This situation corresponds to the intersection 92 shown in FIG. 7A where the two road links that intersect with the current street 59 share the same street name "B Street".

If the answer in the step 112 is negative, the process moves to the step 113 where the navigation system checks whether all the road links are unnamed. If all the road links are unnamed, i.e., no street names are assigned, the navigation system displays as "UNNAMED" in the step 118 (rule (c)). This situation corresponds to the intersection 93 shown in FIG. 7A where the two road links that intersect with the current street 59 are unnamed.

If the answer in the step 113 is negative, the process moves to the step 114 where the navigation system checks whether one of the road links is unnamed while the other road links is named. If the answer in the step 114 is affirmative, the navigation system displays the name of the named road link in the step 119 (rule (d)). This situation corresponds to the intersection 94 or 95 shown in FIG. 7A where one of the road links that intersect with the current street 59 is named while the other road link is unnamed.

If the answer in the step 114 is negative, the process moves to the step 115 which shows the situation where two or more road links that intersect with the current street 59 have street names different from one another. In this case, the navigation system will proceed to the steps 121-129 of FIG. 8C which corresponds to the meaningful cross street selection rule from (e)-1 to (e)-5 noted above. As also noted above, the operational process of FIG. 8C is related to the situations of intersections 96-99 in FIG. 7A.

In the step 121, in the flow chart shown in FIG. 8C, the navigation system determines whether there is a difference in the functional class of the road links. If one road link is higher in the functional class than the other, the street name of the road link with higher functional class will be displayed in the step 126 (rule (e)-1). This situation corresponds to the intersection 96 shown in FIG. 7A where different street names of road links "E Street" and "F Street" intersect with the current street 59 and "E Street" is higher in the functional class than "F Street".

If the answer in the step 121 is negative, the process moves to the step 122 where the navigation system checks whether one of the names of road links is more commonly used than the other. If the answer in the step 122 is affirmative, the navigation system displays the street name more commonly used than the other in the step 127 (rule (e)-2). This situation corresponds to the intersection 97 shown in FIG. 7A where different names of road links "G Street" and "H Street" intersect with the current street 59 and "G Street" is more commonly used than "H Street".

If the answer in the step 122 is negative, the process moves to the step 123 where the navigation system checks whether one of the road links is a one-way street that is not accessible from the current vehicle condition. If the answer in the step 123 is affirmative, the navigation system displays the street name other than the one-way street in the step 128 (rule (e)-3). This situation corresponds to the intersection 98 shown in FIG. 7A where different names of road links "I Street" and "J Street" intersect with the current street 59 and "J Street" is a one-way street that is not accessible by the current vehicle condition.

If the answer in the step 123 is negative, the process moves to the step 124 where the navigation system checks whether there is one road link that is closer to the current vehicle position than the other. If the answer in the step 123 is affirmative, the navigation system displays the street name of the closest road link in the step 129 (rule (e)-4). If there is not one road link that is closest to the vehicle position, the navigation system detects the name of the road link that is on the side of the current street 59 in the step 125 (rule (e)-5). This situation corresponds to the intersection 99 shown in FIG. 7A where different names of road links "K Street", "M Street" and "L Street" intersect with the current street 59 and both "K Street" and "L Street" are equally closer to the current vehicle position than "M Street". Since a vehicle travels on the right-hand side of the street in the United States, the navigation system displays "L Street" which is on the right-hand side of the current street 59.

The order of checking the condition to determining meaningful next cross street in the above procedure may be modified without departing the scope and spirits of the present invention. Moreover, rather than the conditional checking system described above, the navigation system may assign values to the described rules (1)-(3) related to double-digitized road and the rules (a)-(e) for selecting an appropriate street name to determine the most relevant next cross street and its name. The navigation system may go though all the rules described above to arrive at the final decision of the meaningful cross street name after considering a plurality of relevant criteria.

Figure 9:
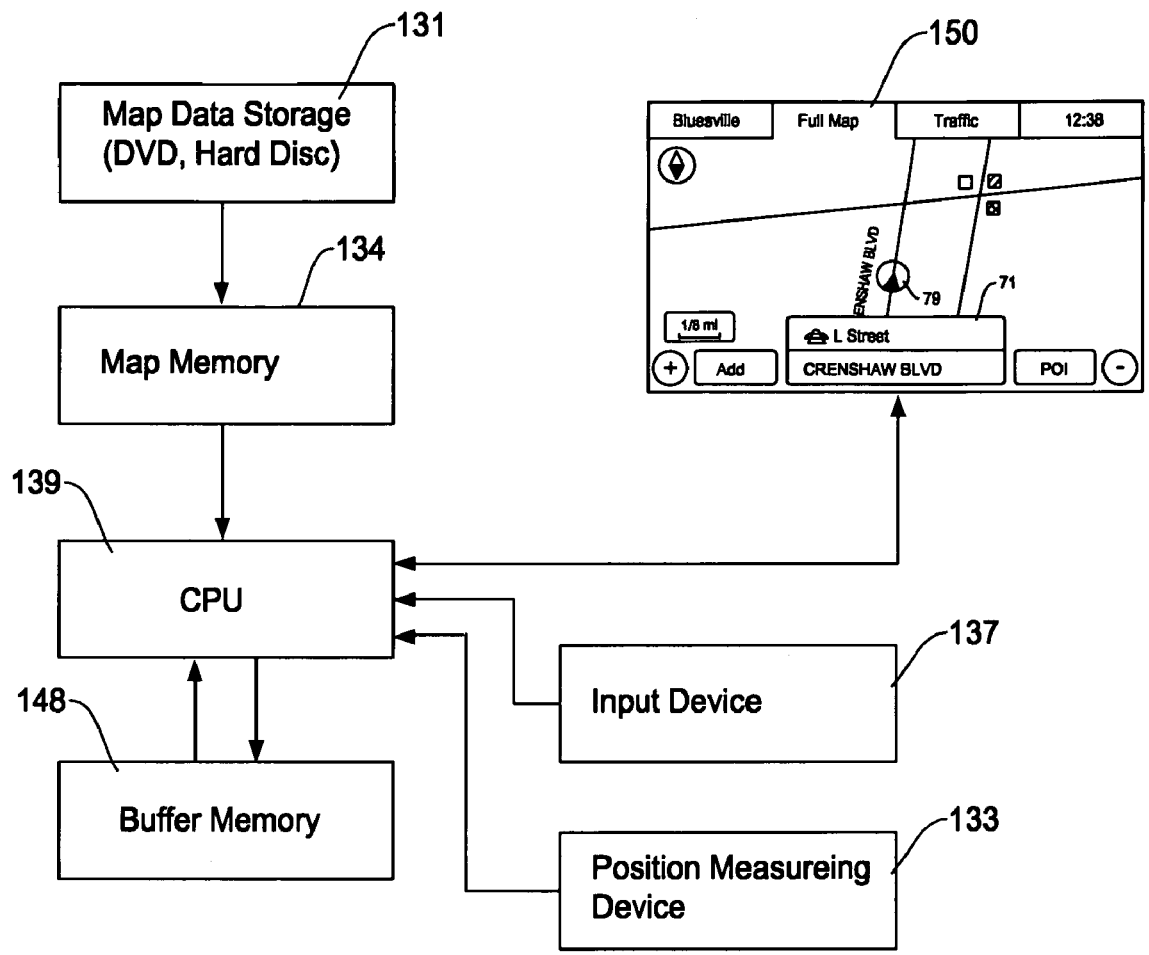
FIG. 9 is a block diagram showing an example of functional structure of the apparatus under the present invention for determining and displaying a meaningful next cross street on the screen.

FIG. 9 is a functional block diagram showing an example of basic structure of the apparatus of the present invention for determining a meaningful cross street and displaying the cross street on the screen of the navigation system. The structure of FIG. 9 is applicable to any electronic device having a navigation function which enables the electronic device to guide the user to a particular location as noted above. The apparatus of the present invention includes a monitor 150 for graphical user interface, and a controller (CPU) 139 for controlling an overall operation of the apparatus.

The block diagram of FIG. 9 further includes a map data storage (data storage device) 131 such as a DVD or a hard disc for storing map data, a map memory 134 for storing a required portion of the map data retrieved from the map data storage 131, an input device 137 such as a joystick, a remote controller or other input device for the user to select menus, change directions, scroll the screen, change the location of the cursor on the screen, etc., a position measuring device 133 for detecting a current position of the user, and a buffer memory 148 for storing data concerning the upcoming cross streets that intersect with the current street.

In FIG. 9, the display apparatus for meaningful cross street under the present invention is able to retrieve the map data from the map data storage 131 and the map memory 134. Based on the retrieved map data, the display apparatus displays the map image on the monitor 150 which may include a street on which the vehicle is running and a current vehicle position, etc. The CPU 139 controls an overall operation of detecting, evaluating, and displaying a meaningful cross street under the present invention.

When the user's vehicle advances on the current street, the CPU 139 checks the map data to see whether there are upcoming cross streets and if so retrieves the data and determines whether such a cross street is meaningful for the user to be displayed on the screen. The information as to where the vehicle (user) is currently located from the position measuring device 133 is used for searching the cross streets. The data concerning the cross streets may be temporarily stored in the buffer memory 148 for efficient processing by the CPU 139.

The CPU 139 applies the rules (1)-(3) related to the double-digitized road and the rules (a)-(e) for selecting an appropriate street name to select the most relevant next cross street and its name. Thus, the CPU 139 determines whether an upcoming cross street is meaningful for the user to be displayed on the screen, and if so, the CPU 139 determines which street name is appropriate for display. Thus, the method and apparatus of the present invention is able to provide the meaningful information with respect to the next cross street thereby avoiding to display the information on meaningless cross street so that the user is not distracted from the safe driving.

Figure 10:
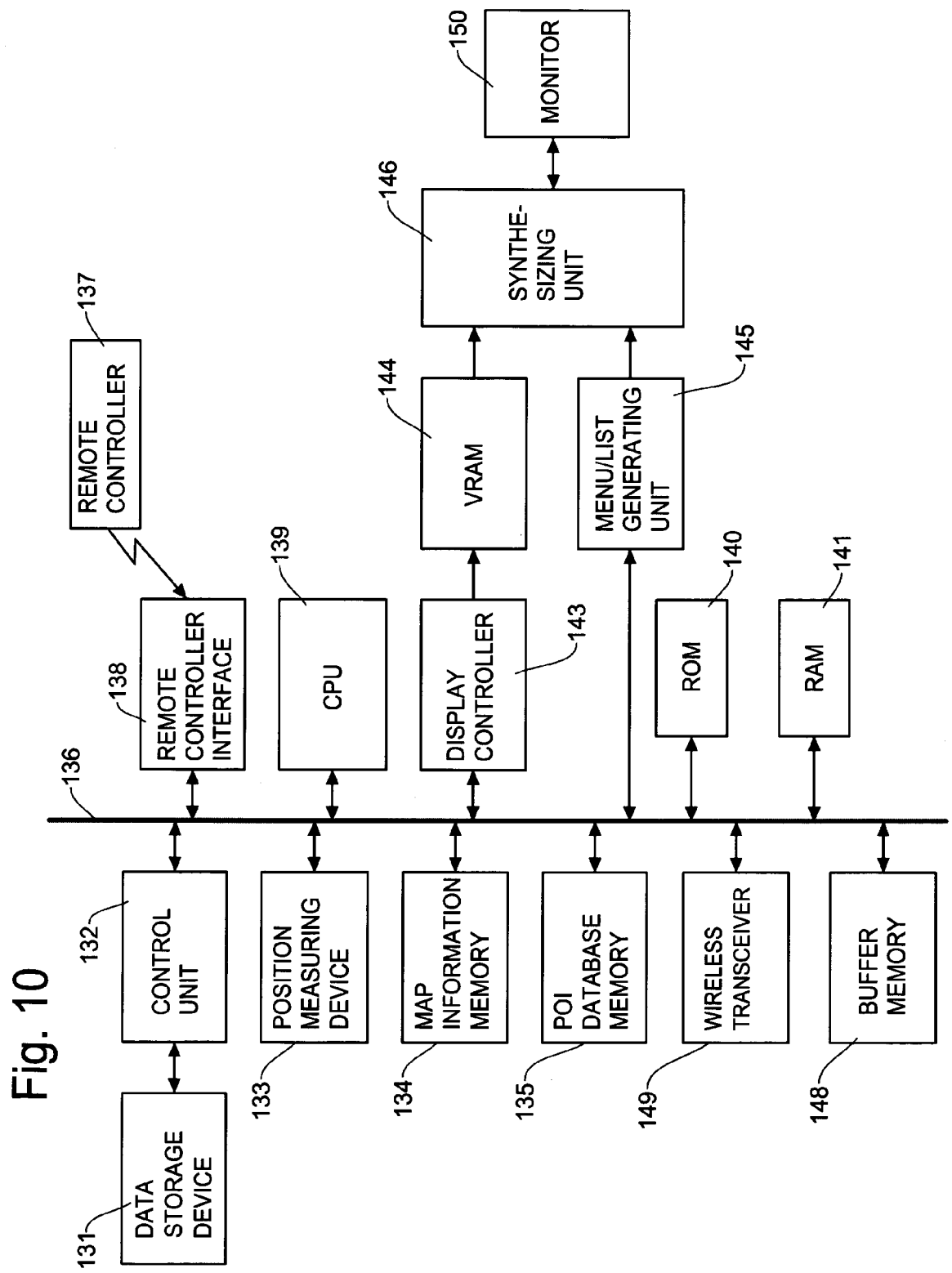
FIG. 10 is a functional block diagram of a vehicle navigation system implementing the method of the present invention for determining meaningful next cross streets.

FIG. 10 shows an example of structure of a vehicle navigation system for implementing the method of the present invention for selecting and displaying a meaningful next cross street. While the vehicle navigation system is explained for an illustration purpose, the present invention can also be applied to other types of navigation system, such as a portable navigation device implemented by a PDA (personal digital assistant) device, other hand-held devices such as a wireless telephone, a wrist watch, a laptop or notebook computer.

In the block diagram of FIG. 10, the functional blocks similar to those of FIG. 9 are denoted by the same reference numerals. The navigation system includes a data storage device 131 such as a hard disc, CD-ROM, DVD or other storage means for storing the map data. The navigation system includes a control unit 132 for controlling an operation for reading the information from the data storage device 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and-analyzing GPS signals, and etc.

The block diagram of FIG. 10 further includes a map information memory 134 for storing a portion of the map data relevant to the intended operation of the navigation system which is read from the data storage device 131, a database memory 135 for storing database information such as point of interest (POI) information which is read out from the data storage device 131, a remote controller 137 for executing a menu selection operation, cursor movements, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 10, the navigation system further includes a bus 136 for interfacing the above functional blocks in the system, a processor (CPU) 139 for controlling an overall operation of the navigation system, a ROM 140 for storing various control programs such as a route search program and a map matching program necessary for navigation control as well as a cross street search and evaluation program for the present invention, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a buffer memory 148 for temporally storing data such as a list of upcoming cross streets within a specified distance range from the current vehicle position and information associated with each cross street for evaluating the cross street by the CPU 139.

The CPU 139 controls an overall operation of the navigation system including the process of the present invention in checking whether there are upcoming cross streets and if so determining whether such a cross street is meaningful for the user to be displayed on the screen. The CPU 139 applies the rules (1)-(3) related to the double-digitized road and the rules (a)-(e) for selecting an appropriate street name to determine the most relevant next cross street and its name. Thus, the CPU 139 determines whether an upcoming cross street is meaningful for the user to be displayed on the screen, and if so, the CPU 139 determines which street name is appropriate for being displayed. As noted above, the data concerning the cross streets may be temporarily stored in the buffer memory 148 for efficiently retrieving and processing by the CPU 139.

A program that performs the procedure of the present invention including the one shown in the flow charts of FIGS. 8A-8C may be stored in the ROM 140 or other storage medium and is executed by the CPU 139. As noted above, the buffer memory 148 may be used for storing the data related to the upcoming cross streets for quickly retrieving and evaluating such data during the operation of the present invention. Thus, the navigation system is able to provide the information to the user on the screen regarding the meaningful cross street that the user will encounter while travelling on the current street.

As has been described above, according to the present invention, the navigation system checks the upcoming cross streets that intersect with the current street on which the user's vehicle is running and determines whether a particular cross street is meaningful for the user to be displayed. Such determination is made by evaluating a particular structure of the cross street, a particular type of the current street on which the user's vehicle is running, a current vehicle position and driving direction, etc. In the case where the cross street is meaningful to be displayed on the screen, the navigation system further determines which name associated with the cross street is more appropriate to be displayed. Such determination is made by evaluating various factors associated with the cross street, such as whether a street is named or unnamed, whether one street name is more commonly used than the other, whether one street is higher in the functional class than the other, whether a particular street is accessible by the user's vehicle, whether a particular street is closer to the user's vehicle, etc. Thus, the navigation system of the present invention provides the user with the information regarding the meaningful cross street while refraining from providing the information concerning a meaningless cross street, thereby avoiding to distract the user from the safe driving.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
    searching upcoming cross streets that intersect with a current street on which a user's vehicle is running for a predetermined distance range ahead of a current vehicle position;
    retrieving data concerning the upcoming cross streets from the map data;
    determining whether a cross street is meaningful for the user to be displayed on a screen of the navigation system by applying predetermined rules to the data concerning the cross street;
    selecting a meaningful cross street name from among a plurality of cross street names when a plurality of cross street names exist for one or more cross streets each having an intersection common to one another;
    checking a type of street of the current street, and if the current street is a double-digitized road, applying predetermined rules associated with the double-digitized road to determine whether a particular cross street is meaningful to the user;
    displaying information on the cross street that has been determined to be meaningful for the user on the screen; and
    displaying the meaningful cross street name of the next upcoming cross street along with a cross street icon in a location information indicator that is a text box provided at a predetermined location.

2. A display method for a navigation system as defined in claim 1, wherein said predetermined rules associated with the double-digitized road include a rule in that if the particular cross street is not accessible to the user because of the current vehicle position and driving direction, the particular cross street is not meaningful to the user.

3. A display method for a navigation system as defined in claim 1, wherein said predetermined rules associated with the double-digitized road include a rule in that if the particular cross street merely connects two one-way street lines of opposite directions that form the double-digitized road, the particular cross street is not meaningful to the user.

4. A display method for a navigation system, comprising the following steps of:
    searching upcoming cross streets that intersect with a current street on which a user's vehicle is running for a predetermined distance range ahead of a current vehicle position;
    retrieving data concerning the upcoming cross streets from the map data;
    determining whether a cross street is meaningful for the user to be displayed on a screen of the navigation system by applying predetermined rules to the data concerning the cross street;
    selecting a meaningful cross street name from among a plurality of cross street names when a plurality of cross street names exist for one or more cross streets each having an intersection common to one another;
    displaying information on the cross street that has been determined to be meaningful for the user on the screen; and
    displaying the meaningful cross street name of the next upcoming cross street along with a cross street icon in a location information indicator that is a text box provided at a predetermined location;
    wherein when it is determined that a particular cross street is meaningful for the user to be displayed on the screen, the method further comprising a step of applying predetermined rules for determining an appropriate name of the cross street to be displayed on the screen in a case where two or more streets are associated with the cross street; and
    wherein said predetermined rules for determining an appropriate name of the cross street include a rule in that if one street is unnamed while other street is named, the name of the other street is displayed.

5. A display method for a navigation system, comprising the following steps of:

searching upcoming cross streets that intersect with a current street on which a user's vehicle is running for a predetermined distance range ahead of a current vehicle position;

retrieving data concerning the upcoming cross streets from the map data;

determining whether a cross street is meaningful for the user to be displayed on a screen of the navigation system by applying predetermined rules to the data concerning the cross street;

selecting a meaningful cross street name from among a plurality of cross street names when a plurality of cross street names exist for one or more cross streets each having an intersection common to one another;

displaying information on the cross street that has been determined to be meaningful for the user on the screen; and displaying the meaningful cross street name of the next upcoming cross street along with a cross street icon in a location information indicator that is a text box provided at a predetermined location;

wherein when it is determined that a particular cross street is meaningful for the user to be displayed on the screen, the method further comprising a step of applying predetermined rules for determining an appropriate name of the cross street to be displayed on the screen in a case where two or more streets are associated with the cross street; and wherein said predetermined rules for determining an appropriate name of the cross street further include a rule in that if one street is higher in functional class than that of other, a name of the street with higher functional class is displayed.

6. A display method for a navigation system, comprising the following steps of:

searching upcoming cross streets that intersect with a current street on which a user's vehicle is running for a predetermined distance range ahead of a current vehicle position;

retrieving data concerning the upcoming cross streets from the map data;

determining whether a cross street is meaningful for the user to be displayed on a screen of the navigation system by applying predetermined rules to the data concerning the cross street;

selecting a meaningful cross street name from among a plurality of cross street names when a plurality of cross street names exist for one or more cross streets each having an intersection common to one another;

displaying information on the cross street that has been determined to be meaningful for the user on the screen; and displaying the meaningful cross street name of the next upcoming cross street along with a cross street icon in a location information indicator that is a text box provided at a predetermined location;

wherein when it is determined that a particular cross street is meaningful for the user to be displayed on the screen, the method further comprising a step of applying predetermined rules for determining an appropriate name of the cross street to be displayed on the screen in a case where two or more streets are associated with the cross street; and wherein said predetermined rules for determining an appropriate name of the cross street further include a rule in that if one street name is more commonly used than other street name, the street name of more commonly used is displayed.

7. A display method for a navigation system, comprising the following steps of:

searching upcoming cross streets that intersect with a current street on which a user's vehicle is running for a predetermined distance range ahead of a current vehicle position;

retrieving data concerning the upcoming cross streets from the map data;

determining whether a cross street is meaningful for the user to be displayed on a screen of the navigation system by applying predetermined rules to the data concerning the cross street;

selecting a meaningful cross street name from among a plurality of cross street names when a plurality of cross street names exist for one or more cross streets each having an intersection common to one another;

displaying information on the cross street that has been determined to be meaningful for the user on the screen; and displaying the meaningful cross street name of the next upcoming cross street along with a cross street icon in a location information indicator that is a text box provided at a predetermined location;

wherein when it is determined that a particular cross street is meaningful for the user to be displayed on the screen, the method further comprising a step of applying predetermined rules for determining an appropriate name of the cross street to be displayed on the screen in a case where two or more streets are associated with the cross street; and wherein said predetermined rules for determining an appropriate name of the cross street further include a rule in that if one street is accessible while other street is not accessible because of the current vehicle position and driving direction, the name of the street that is accessible is displayed.

8. A display method for a navigation system, comprising the following steps of:

searching upcoming cross streets that intersect with a current street on which a user's vehicle is running for a predetermined distance range ahead of a current vehicle position;

retrieving data concerning the upcoming cross streets from the map data;

determining whether a cross street is meaningful for the user to be displayed on a screen of the navigation system by applying predetermined rules to the data concerning the cross street;

selecting a meaningful cross street name from among a plurality of cross street names when a plurality of cross street names exist for one or more cross streets each having an intersection common to one another;

displaying information on the cross street that has been determined to be meaningful for the user on the screen; and displaying the meaningful cross street name of the next upcoming cross street along with a cross street icon in a location information indicator that is a text box provided at a predetermined location;

wherein when it is determined that a particular cross street is meaningful for the user to be displayed on the screen, the method further comprising a step of applying predetermined rules for determining an appropriate name of the cross street to be displayed on the screen in a case where two or more streets are associated with the cross street; and wherein said predetermined rules for determining an appropriate name of the cross street further include a rule in that if one street is closer to the current vehicle position than other street, the name of the street that is closer to the vehicle is displayed, and a further rule in that if one street is on a side same as that the vehicle is running on the current street while other street is on a side opposite to that the vehicle is running on the current street, the name of the street that is on the same side is displayed.

* * * * *